(12) United States Patent
Watters et al.

(10) Patent No.: US 6,617,963 B1
(45) Date of Patent: Sep. 9, 2003

(54) EVENT-RECORDING DEVICES WITH IDENTIFICATION CODES

(75) Inventors: David G. Watters, Sunnyvale, CA (US); David L. Huestis, Menlo Park, CA (US); Alfred J. Bahr, Mountain View, CA (US); Robert J. Vidmar, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/513,327

(22) Filed: Feb. 25, 2000

Related U.S. Application Data

(63) Continuation-in-part of application No. 09/258,073, filed on Feb. 26, 1999.

(51) Int. Cl.[7] .................................................. H04Q 5/22
(52) U.S. Cl. .................... 340/10.41; 340/665; 340/686; 360/60; 360/69; 360/75
(58) Field of Search .............................. 340/10.41, 665, 340/686; 360/60, 69, 75

(56) References Cited

U.S. PATENT DOCUMENTS

| | | |
|---|---|---|
| 2,902,560 A | 9/1959 | Stanback et al. |
| 3,098,136 A | 7/1963 | Stanback et al. |
| 3,911,434 A | 10/1975 | Cook |
| 4,213,292 A | 7/1980 | Dolezal et al. ............. 368/204 |
| 4,500,213 A | 2/1985 | Grimm ........................ 368/208 |
| 4,616,199 A | 10/1986 | Oster ........................... 335/35 |
| 4,646,066 A | 2/1987 | Baughman et al. |
| 4,762,426 A | 8/1988 | Foss |
| 4,764,244 A | 8/1988 | Chitty et al. |
| 4,891,255 A * | 1/1990 | Ciarlo ......................... 428/131 |
| 5,053,774 A | 10/1991 | Schuermann et al. |
| 5,114,504 A | 5/1992 | AbuJudom, II et al. |
| 5,211,129 A | 5/1993 | Taylor et al. |
| 5,214,409 A | 5/1993 | Beigel |

(List continued on next page.)

FOREIGN PATENT DOCUMENTS

| | | |
|---|---|---|
| GB | 2308947 | 7/1997 |
| WO | WO94/27117 | 11/1994 |

OTHER PUBLICATIONS

Texas Instruments RFID Products–Document Center–S2000 Reference Manual, Series 2000 Reader System, Control Module Hardware, RI–CTL–MB2A, RI–CTL–MB6A, Jan. 1998.

(List continued on next page.)

Primary Examiner—Michael Horabik
Assistant Examiner—Matsuichiro Shimizu
(74) Attorney, Agent, or Firm—Beyer Weaver & Thomas LLP

(57) ABSTRACT

A recording device allows wireless interrogation to determine its identity and its state. The state indicates whether one or more physical or chemical events have taken place. In effect, the one or more physical or chemical events are recorded by the device. The identity of the device allows it to be distinguished from a number of similar devices. The recording device may be used in an array of devices that allows wireless probing by an interrogation unit. When probed, each device tells the interrogator who it is and what state it is in. The devices allow multiple use and the interrogator may use a logical reset to determine the state of each device. The interrogator can thus easily identify particular items in an array that have reached a particular condition. The device may record the status of each device in a database to maintain a history for each.

60 Claims, 16 Drawing Sheets

U.S. PATENT DOCUMENTS

| | | | |
|---|---|---|---|
| 5,218,343 A | 6/1993 | Stobbe et al. | 340/572 |
| 5,278,806 A | 1/1994 | Affolter | 368/204 |
| 5,448,220 A | 9/1995 | Levy | |
| 5,461,385 A | 10/1995 | Armstrong | |
| 5,481,262 A | 1/1996 | Urbas et al. | |
| 5,499,017 A | 3/1996 | Beigel | |
| 5,532,932 A | 7/1996 | Niwa | 364/474.3 |
| 5,585,554 A | 12/1996 | Handfield et al. | |
| 5,591,974 A | 1/1997 | Troyer et al. | 250/336.1 |
| 5,680,106 A | 10/1997 | Schrott et al. | |
| 5,691,698 A | 11/1997 | Scholl et al. | |
| 5,712,609 A | 1/1998 | Mehregany et al. | 337/70 |
| 5,717,135 A | 2/1998 | Fiorletta et al. | |
| 5,728,933 A | 3/1998 | Schultz et al. | |
| 5,745,039 A | 4/1998 | Hof et al. | |
| 5,745,049 A | 4/1998 | Akiyama et al. | |
| 5,764,138 A | 6/1998 | Lowe | |
| 5,822,714 A * | 10/1998 | Cato | 702/108 |
| 5,825,302 A | 10/1998 | Stafford | |
| 5,833,603 A | 11/1998 | Kovacs | 600/317 |
| 5,850,181 A | 12/1998 | Heinrich et al. | |
| 5,861,809 A | 1/1999 | Eckstein et al. | |
| 5,883,582 A | 3/1999 | Bowers et al. | 340/825.54 |
| 5,946,179 A | 8/1999 | Fleege et al. | 361/93 |
| 5,949,342 A * | 9/1999 | Frary et al. | 340/665 |
| 5,963,121 A | 10/1999 | Stygar et al. | 337/155 |
| 5,966,066 A | 10/1999 | Mehregany et al. | 337/70 |
| 6,100,788 A * | 8/2000 | Frary | 340/10.1 |

OTHER PUBLICATIONS

Abtech Scientific, Inc. "Interdigitated Microsensor Electrodes(IMEs)", website printout from www.abtechsci.com/imes.html, Last Revised Jul. 25, 2000, 4 pages.

Figure obtained from website www.shuttle.nasa.gov/shuttle/reference/sodb/2–5b.pdf, 1 page.

Goldman, Ken and Mehregany, Mehran, "A Novel Micromechanical Temperature Memory Sensor," *Transducers 95—Eurosensor 1X*, pp. 132–135.

C.L. Britton, Jr., et al., "MEMS Sensors and Wireless Telemetry for Distributed Systems", Mar. 1998, SPIE vol. 3328.

P. Neuzil, et al., "An Integrated Circuit to Operate a Transponder with Embeddable MEMS Microsensors for Structural Health Monitoring", 1997, Structural Health Monitoring, Session 1 pp. 492–501.

B. Westermo, et al., "A Peak Strain Sensor for Damage Assessment and Health Monitoring", 1997, Structual Health Monitoring, Session 1 pp. 515–526.

NASA Jet Propulsion Laboratory, "Automated Cargo–Tracking Transponders", Sep. 1998, NASA Tech Briefs.

Robert Puers, "Linking Sensors with Telemtry: Impact on the System Design", 1995, Transducers, Eurosensors IX, 4 A–1.

T. Akin, et al., "An Implantable Multichannel Digital Neural Recording System for a Micromachined Sieve Electrode", 1995, Transducers, Eurosensors IX, 5–A1.

Koenraad Van Schuylenbergh, et al., "Self Tuning Inductive Powering for Implatable Telemetric Monitoring Systems", 1995, Transducers, Eurosensors IX, 6 A–1.

Ciarlo, Dino R., "A latching accelerometer fabricated by the anisotropic etching of (110) oriented silicon wafers," *J. Micromech. Microeng.* 2, pp. 10–13, 1992.

Kovacs, Gregory T.A., *Micromachined Tranducers Sourcebook*, 1998.

Watters, David G., et al., Subsurface Microsensors for Automated Re–Certification of Thermal Protection Systems (SMARTPS): A Rapid Wireless Inspection Method, *SRI Project 2437*, Final Report, Sep. 1998.

Krantz, Donald, et al., Applied Research in Remotely–Queried Embedded Microsensors, *SPIE*, vol. 3328, Mar. 1998.

Zhang, Yanwei, et al., "Thermally Actuated Microprobes for a New Wafer Probe Card," *IEEE Journal of Microelectromechanical Systems*, vol. 8, No. 1, Mar. 1999.

Cragun, Rebecca et al., "Linear Thermomechanical Microactuators," *Mechanical Engineering Department*, Brigham Young University.

Feynman, Richard P., Excerpt from "Its Plenty of Room at the Bottom," *Engineering and Science*, California Institute of Technology, 1960.

Goldman, Ken, et al., "A Novel Micromechanical Temperature Memory Sensor," *8th International Conference on Solid–State Sensors and Actuators*, and Eurosensors 1X, Jun. 25–29, 1995.

Carr, William N., et al., "Integrated Pressure Sensor with Remote Power Source and Remote Readout," *Transducers 95—Eurosensor 1X*, pp. 624–627.

Press Release, "World's First RFID Tagging IC with Sensor Input Targets Industrial Applications," Microchip, Microchip Website, http://www.microchip.com/10/edit/pRelease/pr120/index.htm.

MCRF202, "Passive RFID Device With Sensor Input," Microchip, *1999 Microchip Technology, Inc.*, pp. 1–8.

* cited by examiner

EVENT-RECORDING DEVICES WITH IDENTIFICATION CODES

CROSS-REFERENCE TO RELATED APPLICATION

This application is a continuation-in-part of a U.S. Patent Application entitled "Wireless Event Recording Devices With Identification Codes" by David G. Watters et al., filed on Feb. 26, 1999 (U.S. application Ser. No. 09/258,073), which is incorporated by reference herein.

STATEMENT REGARDING FEDERALLY SPONSORED RESEARCH

This invention was made with Government support under Contract Order Number A51960D awarded by NASA-Ames. The Government has certain rights in this invention.

BACKGROUND OF THE INVENTION

The present invention relates generally to sensor technology. More particularly, the present invention relates to remote devices used to record the conditions of many items and that allow wireless interrogation to determine their identity and state.

In many sensing applications, it is desirable to determine whether an event has occurred. This event may include an over-limit such as surpassing a property threshold (i.e. a detrimental concentration of a bacteria in food) or may include a time integrated exposure, a material phase change, etc. In some sensing applications, it may be desirable to determine whether multiple events have occurred. The multiple events may include surpassing different thresholds for a property or combinations of multiple events for different properties. In many applications, monitoring an event as the event occurs may not be possible or practical, and thus it may be desirable to determine whether the event has occurred afterwards. In addition, many applications require that numerous items be separately analyzed to determine whether the event has occurred for any of the items. Further, the remote nature of many sensor applications, such as a sensor placed within a sealed container, may demand a wireless form of communication.

The majority of current wireless monitoring systems provide real time response which may not be suitable or necessary in applications where a well defined event is being detected. For the case of detecting an infrequent event, continual real time information feedback for a large number of items may be inefficient. In addition, the complexity and size of real time sensors may make application in many environments unpractical.

Many sensing applications provide significant challenges due to inaccessible, environmentally prohibitive, or functionally disadvantageous conditions. Current device designs often cannot meet this need. Active sensors have been combined with various forms of wireless data communication, but these devices are generally large and require a battery or other subsequent power source. Further, the battery power source and/or attendant wiring may have a limited range of operation, thereby making the system fragile.

One particular example of the need for multiple event-recording devices for a large number of items is in developing faster methods for inspecting and maintaining the structural and functional integrity of large systems. Such systems include highways, bridges, buildings, aircraft, food or waste products, and reusable launch vehicles (RLVs), such as the Space Shuttle. One type of primary failure mode that can affect the Space Shuttle thermal protection system (TPS) tile performance is thermal breach. Thermal breach may be caused by hot gas penetration and over-temperature conditions at the TPS bond line during earth reentry, and results in the loss of gap fillers and/or the dimensional instability of the TPS. Thermal breach is difficult to detect since thermal penetration may damage the interior surface and/or the TPS bond line without clearly showing external indication of damage on the tile's top surface.

Current shuttle inspection techniques involve visual and manual inspection of each of the gaps between all of the nearly 22,000 tiles using a hand held filler gauge to measure the thickness and depth of spaces between the tiles. The inspection may further include looking for other effects of thermal stress such as surface damage, discoloration, silicon deposits, or texture changes of the TPS coating. Thermal protection tiles are bonded to a vehicle using an organic adhesive. If the organic adhesive (normally a shiny red) appears dull or black, a closer inspection is required to determine the extent of charring. Presently, Space Shuttle recertification for reflight requires tens of thousands of person hours to manually inspect each of the 22,000 shuttle tiles. The substantial cost of TPS inspection ranks second in operations costs only behind the propulsion system.

Not only is the current approach very slow and expensive, but human inspection is inherently error-prone. Repetitive inspection of the thousands of tiles leads to inspector fatigue and greater potential for error. The scaffolding required to inspect the vehicle is additionally costly and time consuming to set up. For the next generation of reusable launch vehicles (RLVs), it is desired to reduce turnaround time to 24 hours. As current detection methods are prohibitively time consuming and expensive, an automated means of post reentry inspection of the TPS is desirable.

One proposed approach to maintaining RLV systems involves the use of discreet active sensors which rely on a power source directly connected to the sensor. Examples of active sensors which have been used to discretely monitor RLV systems such as propulsion and guidance include strain gauges, thermocouples, and fiberoptic sensors. However, the size and complexity of the active sensors do not allow for monitoring of the TPS since the abundant number of tiles would necessitate a prohibitively excessive amount of weight and wiring.

In view of the foregoing, there are desired improved structures and techniques for wireless sensing and recording for multiple objects.

SUMMARY OF THE INVENTION

The present invention provides a device that can be interrogated to determine its identity and its state. The state indicates whether one or more particular physical or chemical events have taken place. In effect, the device records one or more physical or chemical events or states. The device states used to record the one or more events may be recycled. The identity of the device allows it to be distinguished from a number of similar devices. Thus this invention finds particular usefulness in the context of an array of devices that can be probed by a wireless interrogation unit. The device tells the interrogator who it is and what state it is in. The devices and interrogation unit may use a logical analysis and reset to determine if an event has occurred. The interrogator can thus easily identify particular items in an array that have reached one or more particular conditions.

Other devices may be used to sense, record and report multiple physical or chemical events or states. The multiple physical or chemical events or states may be different physical or chemical events or states or may be the same physical or chemical state or event occurring numerous separate times. The multiple events or states may occur separately within two interrogations and/or multiple times over numerous interrogations.

In one embodiment for recording multiple events, the recording device assumes multiple distinct states. Each distinct state may be associated with a particular physical or chemical state or event and can be held until another event occurs. Each distinct device state may also be reported by the transponder in response to wireless interrogation. In another embodiment, the multiple device states may be recycled to permit continuous of the device.

In one specific example, the sensor is a temperature sensor and the physical or chemical events or states are exceeding one or more (high or low) threshold temperatures. A suitable device for this purpose may include a circuit as the recording mechanism and fuses in the circuit as the sensor. When a first threshold temperature is exceeded, a fuse opens at least one path through the circuit, thus changing the state of the recording mechanism. In one embodiment, opening the path changes the resonance frequency of the circuit. When a second threshold temperature is exceeded, a second fuse opens another path through the circuit, thus changing the state of the recording mechanism in a different manner than for the first threshold temperature. One way this can be detected is by probing the device with a swept- or stepped-frequency interrogation signal and detecting the peak frequency of the signal sent from the transponder. Similarly, when temperature decreases below a low-temperature threshold, a liquefied material freezes, thereby changing a circuit path from open to closed (or vice versa) as above.

When numerous devices are implemented (in an array for example), the identification and state of each device may be stored in a database or otherwise recorded. Upon subsequent interrogation of a device, the prior state of the device stored in the database may be used to interpret the current state of the device due to one or more events. The database also allows a history for each device to be maintained.

To keep the device small and simple, it is preferably passive; that is, it does not include its own power source. Thus, the transponder component is preferably passive. In the example described, the radio frequency interrogation signal (or a separate energizing signal) may provide the transponder power. The sensor component and/or the recording mechanism are also preferably passive. In some cases, the physical or chemical events or states themselves provide the power for the recording mechanism to record the one or more events. For example, exceeding a threshold temperature melts a fuse in the above example.

In one embodiment for recording a single event, the recording mechanism assumes a first state when the one or more physical or chemical states or events have not been recorded and assumes a second, third, or further state when the one or more events or states have been recorded. Any state can be reported by the transponder in response to a wireless probe. Preferably, the recording mechanism can be reset after interrogation—either physically in the device or logically—but cannot spontaneously return from a state used to record an event to the first state when the physical or chemical state or event ceases or the change in the physical or chemical state reverses. Thus, when the temperature drops back below a threshold temperature (the physical event ceases), the recording mechanism will retain information that the device once exceeded the threshold.

The recording mechanism can take many different forms. It may be a mechanical structure, such as a latching structure, a microelectomechanical device, an integrated circuit memory device, an electrical circuit, an optical circuit, and the like. Likewise, the signal transmitted by the transponder may be provided on many different carriers. For example, the signal may be provided on an acoustic wave, a radio frequency wave, an electrical field, a magnetic field, a microwave frequency wave, a light wave, and the like. If the carrier is a wave of appropriate frequency, the transponder may include a modulator and an antenna.

To allow concurrent detection of multiple events or to allow more precise detection of a parameter value (e.g., temperature), a device of this invention may be designed with a plurality of recording mechanisms or sensors, each configured to record or detect a different physical or chemical state or event and/or the same event for a similar object. The different physical or chemical events or states may be associated with different physical properties (parameters) such as temperature and strain. Alternatively, the different physical or chemical events or states may represent different thresholds of a single physical property. For example, the different thresholds of the single property may be two substantially different temperature thresholds. In this way, a maximum or minimum temperature may be precisely bracketed as determined by which of the sensors or recording mechanisms changed states.

In some embodiments, a single structure serves multiple purposes. For example, a resonant electrical circuit may serve as an antenna, a modulator, and a recording mechanism.

One aspect of the invention provides a system for reporting a physical or chemical state or event. The system comprises a device having at least two device states and one of the two device states corresponding to the physical or chemical state or event. The device comprises a sensor for detecting the physical or chemical state or event. The device also comprises a recording mechanism coupled to the sensor and recording the device state such that the device state changes upon occurrence of the physical or chemical event or a change in the physical or chemical state. The device further comprises a transponder configured to transmit a signal indicating the device state when triggered by a wireless interrogation signal. The system also comprises an interrogator for externally probing the state of the device to determine whether the device state has changed. The interrogator is designed or configured to (i) read the device state by providing the wireless interrogation signal (and power) to the transponder, (ii) compare the device state that it has read against a stored device state (the state was stored either in its memory or in an associated computer database) to determine whether the device state has changed and thereby indicate the physical or chemical event or the change in the physical or chemical state, and (iii) update the stored device state with the device state that it has just read.

Another aspect of the invention provides a method for reporting a physical or chemical state or event by using a device that changes a device state when exposed to the physical or chemical state or event. The method comprises exposing the device to a first environment. The method also comprises probing the device with an interrogator to determine its current device state and thereby determine whether the first environment provided the physical or chemical state or event. The method further comprises saving the current device state as a saved device state. The method additionally comprises, without physically resetting the device state, exposing the device to a second environment which potentially could provide the physical or chemical state or event to cause the device state to change. The method also comprises probing the device with the interrogator to determine if its current device state is different from the saved device state and thereby determine whether the second environment provided the physical or chemical state or event.

Still another aspect of the invention relates to a device for reporting a physical or chemical state or event. The device comprises a sensor for detecting the physical or chemical state or event without using a power source. The device also comprises a recording mechanism coupled to the sensor for recording that the physical or chemical state or event has occurred, wherein the recording mechanism allows recording of multiple physical or chemical events or state changes, each associated with a distinct device state. The device additionally comprises a tag that contains identification information that can distinguish said device from a plurality of similar devices. The device further comprises a transponder, coupled to the recording mechanism and the tag, configured to transmit a signal indicating (i) the device state and thereby indicating the physical or chemical state or event and (ii) the identification information when triggered by a wireless interrogation signal.

These and other features and advantages of the present invention will be described in the following description of the invention and associated figures.

DETAILED DESCRIPTION OF THE PREFERRED EMBODIMENTS

1. Overview

Figure 1:
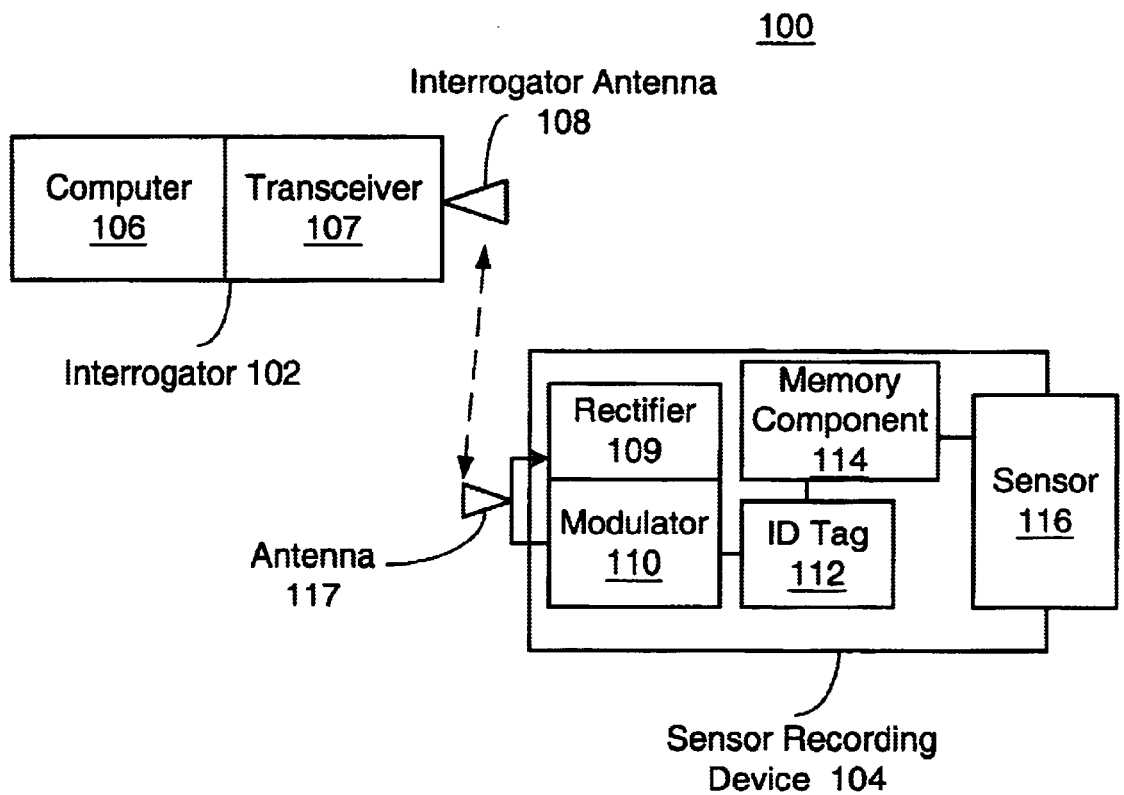
FIG. 1 shows a block diagram of a wireless event-recording device monitoring system, in accordance with one embodiment of the invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Generally, the methods and apparatus of this invention report physical or chemical events or states using easily implemented devices on systems where large numbers of points must be analyzed. These points may be separated spatially or temporally. Each such point is associated with a separate recording device of this invention. Together they may form a sensor array (spatial separation). Preferably, each recording device of such array has a unique identifier that permits it to provide a separate distinguishable reading while the entire array is probed. Within the recording sensor device, a sensor is coupled to some mechanism for recording one or more sensed events. The recording mechanism maintains an indication that the one or more events have occurred even after the event or events cease to occur. For example, an over-temperature recording device should continue to indicate that a threshold temperature has been exceeded even after the temperature drops below the threshold.

Recording the event advantageously allows interrogation of the sensor at a time and/or place more practical or convenient than when/where the physical or chemical event took place. It also may eliminate the need for real time monitoring or continuous recording, thus eliminating the need for continuous power and data processing.

Generally, the recording devices of this invention detect a physical "event" associated with a "parameter." The parameter is usually a physical property of an item such as its temperature, density, strain, deformation, acceleration, pressure, mass, opacity, concentration, chemical state, hardness, conductivity, magnetization, dielectric constant, size, etc. The physical or chemical event that is sensed and recorded may be the attainment within the item of a particular value of the physical property. For example, the physical or chemical event may be reaching a particular threshold temperature within a material that bonds a thermal protection tile to a RLV. The event may also be a change of state such as a phase change in the item being sensed. Examples of phase changes include transformations between gas, liquid, and solid states, changes in morphology (e.g., crystalline state), magnetization, and the like. Examples of other state changes include a transition from an excited to a relaxed state, a charged to a non-charged state, an energy storage or discharge, or a digital change from a "1" to a "0" representing a physical process.

The present invention is also suitable for detecting multiple events. The multiple events may be associated with multiple parameters, multiple thresholds for the same parameter, or a combination thereof. For example, the physical or chemical events may be different threshold temperatures within a material that bonds a thermal protection tile to a RLV.

Note that the event to be detected could be a very fast or instantaneous event or one that requires a significant time to unfold. In this regard, a time-integrated exposure by the event-recording device will sometimes be appropriate. In this manner, detection of a new steady state condition along a continuum values can be detected and reported.

2. General Structure of Devices

FIG. 1 shows a wireless recording device system 100 of this invention. An interrogator 102 probes an individual multiple event-or multiple state-recording device 104 through wireless communication. Interrogator 102 may include any circuitry capable for performing this function. In this case, interrogator 102 includes a computer 106, a transceiver 107 and an interrogator antenna 108. In one embodiment of the invention, coupling between interrogator 102 and the individual event-recording device 104 is by radio frequency (RF) radiation.

Event-recording device 104 includes a rectifier 109, a modulator 110, an identification (ID) tag 112, a memory component 114, a sensor 116 and an antenna 117 (which together with modulator 110 serves as a wireless transponder). Sensor 116 is preferably, but not necessarily, a passive sensor, which records one or more specific physical or chemical events or states. In some cases, it may be viewed as being energized by the quantity being sensed (e.g., thermal energy provides the energy to record an over-temperature condition). Because applications in which the individual event-recording device 104 are implemented may vary considerably and may include environmentally prohibitive conditions, specific features of the sensor 116 may be governed by a particular application. Thus, the sensor 116 broadly refers to any sensor capable of detecting the intended physical or chemical event or events. For example, in a TPS monitoring system, all components of the event-recording device 104 such as the sensor 116 would be expected to survive temperatures near or above 200 degrees Celsius depending on their location on the vehicle.

Memory component 114 allows for recording one or more events detected by the sensor 116 and subsequent reading by interrogator 102. In one embodiment, the memory component 114 is "unidirectional" with respect to the one or more events such that once an event has occurred, and the memory component 114 has been altered, regressions of the event are unable to revert the memory component 114 to a state used before the event. For example, if the event is surpassing a temperature threshold, and the memory component 114 converts from a first state to a second state as a result of surpassing the temperature threshold, temperatures dropping below the temperature threshold will not revert the memory component 114 to the first state. In many cases, the sensor and quantity being sensed are unable to drive the memory component 114 back to a state used before the event. However, as will be described in further detail below, memory component 114 may include the ability to record multiple events using multiple states, each of which may be re-used or whose current status may be stored for an individual device by the computer 106. In addition, the memory component 114 may be resetable by other means including manual reset and RF induced reset.

When probed by interrogator 102, event-recording device 104 replies with its ID (from identification tag 112) and information contained in memory component 114. The information from memory 114 should indicate whether the one or more physical or chemical events of interest have occurred. This information is read out along with the device's identification code. The ID code provides a means for automatically logging the data entry corresponding to the status of each device in a group of devices.

In some preferred embodiments, the interrogator provides power to the event-recording device. The power is transmitted by RF waves, for example. Rectifier 109 of the transponder rectifies the signal, thereby providing sufficient DC voltage to operate any digital circuitry of the device.

Note that a single structure or mechanism can serve as two or more of the components in event-recording device 104. For example, a resonant electrical circuit can serve as both modulator 110 and antenna 117. Further, a single circuit can serve as both memory 114 and some or all of the transponder. For example, some recording devices use backscatter modulation to respond to the interrogator. One way to accomplish this backscatter modulation is to vary the load impedance of a resonant circuit. The circuit that performs this function (of varying the impedance) may be described as modulator and the memory.

The example of FIG. 1 assumes that the wireless communication takes place via electromagnetic radiation of appropriate frequency. Thus, an antenna is required. Generally, however, the interrogator and recording device may be designed to allow any suitable probe signal or carrier (not just RF or other electromagnetic radiation). The carrier should allow the device to be probed from a substantial distance and over a wide area. It should also be able to power the transmission of data from the sensing device to the interrogator. The carrier should also provide sufficient bandwidth to transfer the desired information in a timely manner. Additionally, the modulated carrier may also be sufficiently unique, in terms of frequency or time synchronization, or coding, such that it is distinguishable from the signal provided by nearby event-recording devices. Generally, the carrier may be a wave or field or other intangible effector that acts over a distance through a medium (vacuum, gas, fluid, solid, etc.) between the interrogator and the recording device. Examples of suitable carriers include RF radiation, microwave radiation, visible, ultraviolet, and infrared radiation, acoustic waves, electric fields, magnetic fields, and the like. If the system employs RF radiation, the frequency preferably ranges between 100 kHz and 5800 MHz and is provided at a power of between about 7 and 2 Watts, respectively (as specified by the IEEE, see for example IEEE C95.1-91, http://trolleyscan.co.za/technic3.html). In a specific embodiment, the interrogator may operate at an approved frequency at or near that used for an available RFID device; e.g., near 103 kHz in one case and about 13 MHz in another case. Microwave radiation provides another preferred carrier. Generally, it provides the same functionality as RF radiation, but at larger read ranges. Typically, any approved or regulated band such as the ISM bands at 945 MHz, 5.8 GHz and 2.45 GHz may be used.

3. Sensors

In general, a variety of sensors may be used in the recording devices of this invention. The sensor chosen for a particular application should be able to detect the physical or chemical event or events under consideration. Thus, the sensor should detect a change in the parameter or parameters associated with the one or more physical and/or chemical events. For example, a temperature sensor should be used to detect whether the bonding material of a TPS tile of an RLV reached one or more over-temperature conditions. Further, the sensor should have a dynamic range that covers the physical and chemical events in question. Each time a specified physical or chemical event occurs, the sensor should trigger a change in the associated recording mechanism. The sensor should also be able to withstand the operating conditions to which it will be exposed and fit within good design practices including reliability, accuracy, size, weight, safety, and compatibility with other components and the application.

Conventionally, most sensors are stand-alone, directly powered devices that provide real time measurements of the quantity being sensed. For many applications important to this invention, such conventional active sensors are not suitable because the required power may make them unduly complex and large. For example, powered devices often require their own battery or wiring to a central power source. Further, many applications suitable for the recording devices of this invention require detection of only one or a few physical or chemical events or states. Thus, they do not require continuous monitoring of or reporting on the parameter of interest. Preferably, sensor 116 of event-recording device 104 is a small device responsible for detecting one or more events as opposed to real time feedback.

Most any type of sensor may be used with this invention, so long as it meets the functional requirements. Sensors may be classified based upon the parameters that they sense and the transduction mechanisms they employ. Very many sensor types are known and used for different applications.

Many examples of things to be sensed and sensing mechanisms are described by Julian W. Gardner in "Microsensors: Principles and Applications," John Wiley, 1994 (incorporated herein by reference in its entirety and for all purposes). Among the listed items are (1) thermal sensors: temperature, heat, heat flow, entropy, heat capacity; radiation sensors: gamma rays, X-rays, UV, visible, IR, microwaves, radio waves; mechanical sensors: displacement, velocity, acceleration, force, torque, pressure, mass, flow, acoustic wavelength, amplitude; magnetic sensors: magnetic field, flux, magnetic moment, magnetization, magnetic permeability; chemical sensors: humidity, pH level and ions, concentration of gases, vapors and odors, toxic and flammable materials, pollutants; biological ensors: sugars, proteins, hormones, antigens; electrical sensors: charge, current, voltage, resistance, conductance, capacitance, inductance, dielectric permittivity, polarization, frequency, and the like.

A transduction mechanism is usually needed to convert the sensed quantity or stored event into an electrical signal. Suitable transduction examples include conductometric (changes in resistance or conductivity), potentiometric, capacitive, amperometric, calorimetric, optical, resonant, fluorescent, piezo-electric, optoelectric, magnetooptic, surface-acoustic wave, magnetoresistive, superconductive, and other effects.

Just for temperature sensors, many different sensing mechanisms may be employed. Constitutive parameters that change with temperature include (but not all inclusive) physical size and shape (e.g. linear coefficient of thermal expansion), resistance, capacitance (permittivity), permeability (inductance), electron or hole mobility, carrier concentration (semiconductor device), density, mechanical properties, such as elastic modulus, velocity of sound, magnetostricture properties, non-linear thermal effects, thermoelectric effects, piezoelectric effects, melting point, opacity, (reflectance, transmittance, polarization, emissivity, IR) and so on. These effects can be transduced by changing or generating a DC, AC, or RF electric current, electric voltages, by changing or generating an acoustic/optical/infrared/X-ray signal, etc. Preferably, the sensing mechanism is an unpowered, passive device that will store or release energy from a memory device that is polled later on. This state change or energy change could be reversible or non-reversible. For example, something that expands with temperature should be connected to a device that latches at the temperature of interest. The latching device may change the properties of a circuit that is interrogated later on. The latch could be reset mechanically, electrostatically, electromagnetically, thermally, logically, and by other means for automatic reset.

Specific sensors that may be used in preferred embodiments of this invention include temperature sensors, pressure sensors, flow sensors, stress/strain sensors, accelerometers, dielectric sensors, conductivity sensors, sensors that detect or measure chemical or biochemical species, shock sensors, vibration sensors, position sensors, sensors that detect thermal exposure, optical exposure, x-ray exposure, microwave exposure, pollutants, particle size, alignment, and the like. Many sensors suitable for this invention are commercially available.

More specific examples of sensors for use with this invention include silicon-based pressure transducers for over stress sensing (in either fused or resetable designs), capacitive bridges for distinguishing between uncharred, charred and brittle-charred filler in the TPS application, acoustic sensors for detecting embrittlement by detecting differential levels of elastic modulus and acoustic propagation characteristics, microwave bridges or sponges for detecting moisture content or the presence of a waterproofing solvent (ethanol for example), fuses for detecting threshold temperatures, wires that break when exposed to corrosive environments for suitable intervals, enclosures that change shape when a chemical reaction is completed, etc.

4. Memory Component

As indicated above, the event-recording devices of this invention include some form of recording mechanism coupled to the sensor. Most conventional sensor systems work on a real time basis and do not store information. If the information is stored at all, it is done on system external to the sensing device itself. For many important applications, it is not necessary to have real time monitoring of a parameter. All that is required is that the some physical or chemical event or events associated with one or more parameters be recorded. Further, for many applications, real time monitoring would require a prohibitively complex or fragile system. For example, when an RLV reenters the earth's atmosphere, the extremely aggressive conditions would destroy a typical real time monitoring system.

Generally, the memory device should record a physical or chemical event when the sensor provides an indication that the event has occurred. "Recording" usually means that the mechanism has changed. For example, the recording mechanism's resonance frequency changes or the spatial location of a beam changes, or a digital value in a memory location changes, etc. The state change should not spontaneously reverse. Thus, when the physical or chemical event triggers a change from state 1 to state 2, the recording mechanism should remain in state 2 even after the physical or chemical event ceases or reverses back to state 1. Further, the recording mechanism should cause a sufficient change in the operation of the device to be detectable by the chosen interrogation means. In the case of a resonant circuit, for example, the frequency shift recording the event needs to be measurable. Generally, the recording resonant circuit needs to change frequency by an amount greater than the width of the resonance (quality factor Q). Examples of recording mechanisms include electrical circuits, electromechanical circuits, mechanical latching mechanisms, programmable integrated circuits such as EPROMs, fusible links, magnetic circuits, acoustic circuits, optical/IR circuits, and the like. In an acoustic circuit, impedance and resonance can change to record an event. In an optical circuit, a path length, reflectivity, etc. can change to record the event.

Often it will be convenient to integrate the recording mechanism and sensor in a single device such as a circuit or mechanical device. For example, the recording mechanism may be an electrical circuit having a particular resonance frequency and the sensor may be a fuse in one leg of the circuit. A few specific examples of such combinations will be discussed below with reference to FIGS. 3, 4A, and 4B.

In some embodiments of the present invention, the memory component includes multiple recording mechanisms or sensors, all able to record different physical or chemical events or states. The different physical events may all pertain to the same parameter such as temperature. For example, an over-temperature detection system may include three separate recording components and/or sensors, each configured to record a separate threshold temperature: e.g., 200, 250 and 275 degrees Celsius. In another embodiment, memory component and/or sensor is configured to sense different parameters. For example, in a food processing application, a pressure sensor for measuring container pressure is used along with a chemical sensor sensitive to a particular bacteria concentration, both of which are independently coupled to a memory component, which is capable of recording separate events for each sensor.

Preferably, progression between multiple states of the memory component 114 is unidirectional with respect to the events being sensed. More specifically, the multiple states of the memory component 114 may be implemented such that once one or more events have occurred, and the memory component 114 has been altered from a first state to a second, third or further state, the memory component 114 is unable to re-use any previous state until the object has been interrogated. At this point, the memory component 114 may be reset to record further events either with external help, e.g., from the interrogator 102, or logically. In some embodiments, a changed status for the memory component 114 may be recorded by the interrogator and used as a first state or "no event" for subsequent interrogations. In this manner, multiple states of the memory component 114 may be recycled.

5. Device Identifiers

As indicated in the discussion of FIG. 1, event-recording devices of this invention preferably include an identifier tag (reference number 112). Generally, a wireless probe of the sensor device should return a value or other source indicator provided by the ID tag. That value preferably uniquely identifies the particular device providing the report. This allows it to be distinguished from a number or other devices as would be encountered in an array of devices on a system. Preferably, the identifier tags are small devices that contain an identification (ID) code that can be read remotely using the interrogator. In the case of an array of sensors—each associated with a separate item in a system under test—the idea is to sense and store one or more events of interest, such as whether the temperature under a tile exceeded a threshold value during re-entry, and then read it out along with the device's identification code during a subsequent analysis (e.g., a post-flight inspection). The ID code provides a means of automatically logging the data entry corresponding to the status of each ID tag and corresponding item (e.g., a RLV tile).

Various types of identifier tags are known in the art and may be used with this invention. Examples of ID tags include microchips storing the ID code (e.g., an EPROM), magnetic recording devices, surface acoustic wave devices, electrical circuits providing a plurality of resonant circuits, optical bar codes, and the like. In some cases, the ID tags do not include a unique number but includes other information which may distinguish a device from other similar devices. By way of example, the device's known location may be used to distinguish it from other devices.

Some identifier tag/interrogation systems are designed to be polled one at a time (serially), while other interrogators are able to poll multiple tags simultaneously. Communications strategies typically make use of anti-collision and arbitration procedures that control the time when a tag responds to a probe.

Wireless ID tags are commercially well known and there exists numerous manufacturers that currently offer a wide selection of RFID tags. These tags are either passive (typically operating near 125 kHz) or active (often operating near 2.45 GHz). Major manufacturers include Texas Instruments of Dallas, Tex., Micron Communications of Boise, Id., arid Motorola of San Jose, Calif. Products are available for inventory control, pet identification, product labeling, etc. For example, event-recording device 204 may use a commercial RFID tag, such as the 125-kHz Destron-Fearing tag, supplied by Biomark, Inc. of Boise Id., which includes a microchip and a ferrite-loaded inductor with a resonating capacitor on a PC board, all in a glass-encapsulated enclosure. Preferably, the invention utilizes an RF technology, such as one that is commercially available. Some of these products are designed to withstand high temperatures (e.g., up to 200° C.) for short periods of time (Motorola's Indala tags, for example). It may also be desirable for the tags to be substantially immune from other disturbances such as vibrational, magnetic and gravitational effects. Such robust identifier tags may be useful in aggressive environments such as those encountered by a RLV during reentry.

Figure 2A:
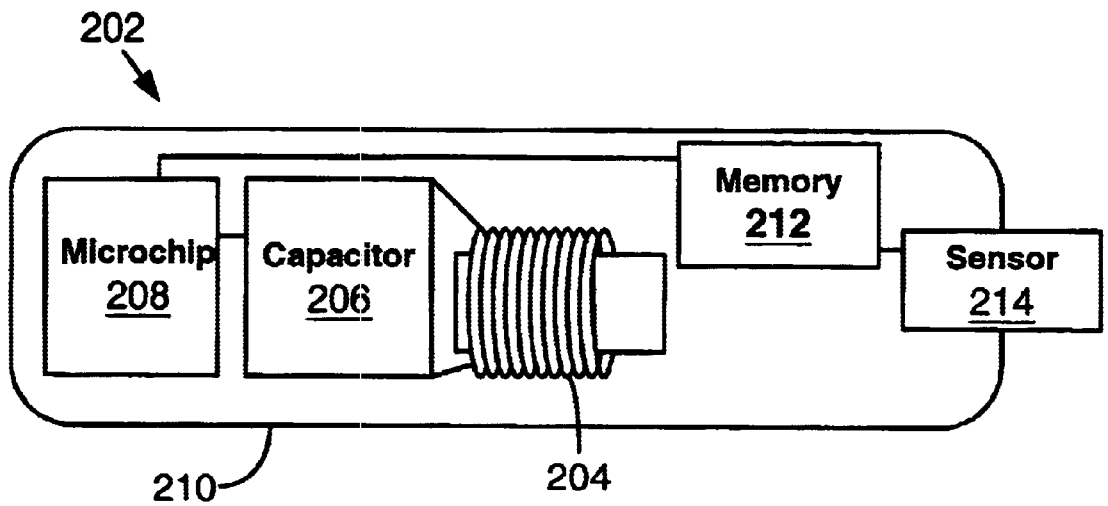
FIG. 2A illustrates typical components of a low-frequency RFID tag used in a recording sensor device of this invention.

Often the identifier is closely coupled to the transponder. For example, FIG. 2A illustrates typical components of a commercial low-frequency "rice-grain" RFID tag 202. Commercial RFID tag 202 may include a ferrite-rod inductor 204 (an antenna), a resonating capacitor 206, and a silicon microchip 208. The components are conventionally connected together using bonding wire or rigid metal rails. The entire RFID, together with a sensor 214 and a memory component 212, may be encapsulated in glass 210 for environmental protection.

Figure 2B:
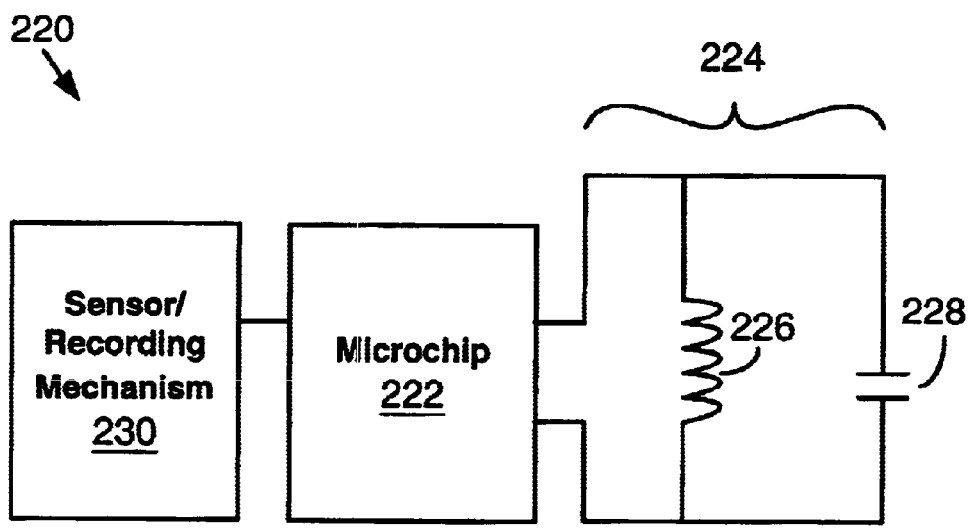
FIG. 2B illustrates a circuit diagram configuration of a low-frequency RFID tag consisting of a microchip and an antenna and used in a recording sensor device of this invention.

FIG. 2B illustrates a circuit diagram configuration of a commercial low-frequency "rice-grain" RFID tag including a microchip 222 and an antenna 224. In this case, an inductor 226 and a capacitor 228 form a parallel-resonant circuit. This circuit produces a maximum output voltage when the frequency of the incident field corresponds to the resonant frequency. The microchip may rectify the incident RF signal when charged to a sufficient voltage and return the identification code residing in its non-volatile memory, stored in microchip 222 in this case, to the remote interrogator using backscatter modulation techniques. In this case, the reader may use a relatively large loop antenna operated in series resonance. This configuration produces maximum current (and hence maximum magnetic field) at resonance, resulting in efficient coupling of energy into the RFID tag. Note that the transponder/identification tag are coupled to sensor/recording mechanism 230. A description of low-frequency RFID operation is provided in "23 mm Glass Encapsulated Transponder Reference Manual" Jul. 23, 1996, published by Texas Instruments Corporation (www.TI.com/mc/docs/tiris/docs/manuals/23mmr.htm) and incorporated herein by reference for all purposes. The described device uses an FM modulator to transpond the data.

Preferably, the device is designed so that device identification information is sent by the transponder regardless of whether the event or state of interest has occurred. This ensures the interrogator that the device is functioning, regardless of what state its recording mechanism is in.

6. Transponder

Generally, a transponder is a device that responds to a stimulus. More specifically, it automatically transmits signals when actuated by a signal from an interrogator. In a common form, it includes an amplifier for increasing the strength of a received incident signal (from the interrogator or other actuating device), a modulator for modifying that signal with information provided to the transponder, and an antenna or antennas for receiving and transmitting. The modulator is that part of the transponder that impresses information on the transmitted signal. A "transceiver" may be a component of a transponder responsible for transmitting and receiving signals, usually independent of one another.

Note that in the example of FIG. 1, rectifier 109, modulator 110 and antenna 117, together act as a transponder. Rectifier 109 and modulator 110 are responsible for communication with interrogator 102 through antenna 117 and contain circuitry capable of carrying out this function. This design is specific to systems employing electromagnetic radiation of an appropriate frequency (e.g., microwave or RF) as the wireless carrier. Other transponder designs are appropriate for other wireless carriers and signals. For example, transponders may be designed for use with acoustic, optical, IR, or electromagnetic sources which are inductively or capacitively coupled. Note that the interrogator (or other probing device) may employ a multi-band or multi-frequency source having one frequency to supply power and a second frequency for interrogation, for example.

Generally, the transponder functions to receive and transmit wireless signals. It receives a wireless probe signal from an interrogator and that signal may include sufficient power to allow its transmission of the device's identifier and recorded state back to the interrogator. It is coupled to the identification tag and the recording mechanism in a manner giving it access to the identifier and recorded state during probing. In general, the interrogation and energizing signals are separate entities. In some embodiments, they are provided by the same means for simplification purposes or may include an amplifier to facilitate signal transmission.

7. Examples of Event and State-recording Devices

Figure 3:
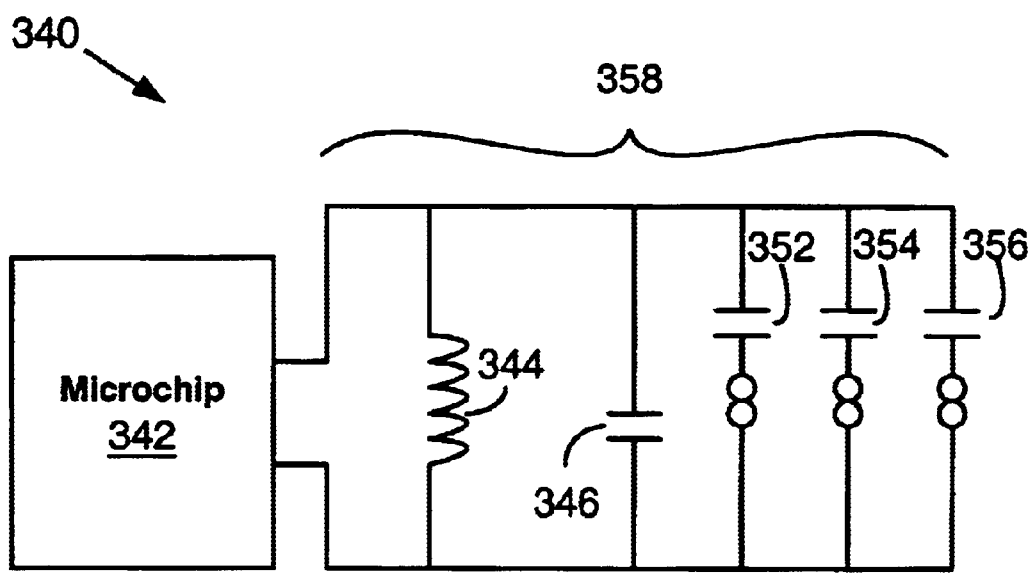
FIG. 3 illustrates an embodiment of the present invention which uses a meltable antenna circuit to unidirectionally record multiple temperature thresholds.

FIG. 3 illustrates one embodiment of the present invention. This embodiment uses a fused antenna circuit 340 to unidirectionally record several temperature thresholds. As shown, it includes the identifier and transponder circuitry illustrated in FIGS. 2A and 2B. However, it has been modified to include a number of additional capacitors and fuses in parallel with the existing capacitor. Generally, circuit 340 includes a microchip 342 (which serves as the identification tag) and an antenna circuit 358. In this embodiment, antenna circuit 358 serves as both the recording mechanism and a portion of the transponder. It also includes the sensors (fuses 352, 354, and 356), each provided on a separate leg of the circuit.

Antenna 358 includes an inductor 344 (e.g., a ferrite-loaded inductor), a resonating capacitor 346 and may include the additional capacitors illustrated on the circuit legs of multiple fused sensors 352, 354 and 356. In the depicted embodiment, each additional capacitor may be connected in series to a fuse protected by dielectric encapsulation. The fuse may be designed to melt at a predefined temperature, thereby changing the resonant frequency of the antenna. In a specific embodiment, the resonant frequency changes from 103 kHz when the circuit is closed to 156 kHz when the circuit opens after detecting a 169-degree Celsius threshold. Capacitance values can be chosen to provide frequency shifts sufficient to dominate over those due to component tolerances and environmental changes. The modified unit may be encapsulated for protection from environment conditions. In this manner, the illustrated embodiment allows unidirectional temperature threshold storage using a meltable antenna circuit that may subsequently be interrogated.

The event-recording device 340 rectifies an incident RF signal coming from an interrogator, such as interrogator 104 of FIG. 1, to provide DC power for the microchip 342. Once the microchip 342 is activated, it modulates the incident carrier with the proper ID code and provides a modulated backscatter signal as mentioned above. A remote receiver reader, which may be coupled to the interrogator, detects this modulated backscattered signal and records the ID information. If the antenna 358 is constructed from regions of metallization connected by thin solder bridges (fuses), then when the solder melts, the resonant frequency of the antenna 358 will shift. The remote receiver looks for the tag response at a specific frequency, and if the frequency has shifted, a temperature over-limit is indicated and recorded for the particular event-recording device. The device 340 may then be reset—by electrothermally reflowing the solder in this case. In addition to connecting the sensor to the RFID in a glass encapsulated enclosure as in FIG. 3, antenna circuit 358 may also be integrated with the silicon microchip in other manners. One example employs glass feedthroughs, where a glass encapsulated integrated circuit (IC) is constructed with feedthrough connections for sensors or actuators (i.e., a microstimulator as used in biological implants).

In general, the event-recording device design of FIG. 3 is not limited to any particular number of sensors. In the simplest case, the device employs only a single sensor (one fuse in this case) to sense one or more events. Further, the device of FIG. 3 is not limited to temperature threshold sensing. As indicated previously, sensor categories may include, for example, temperature sensors, pressure sensors, flow sensors, stress/strain sensors and accelerometers. In any case, discreet physical or chemical events or states must disconnect the "legs" of this circuit design. The type of actuation used by the sensor may have to be varied. For example, the fuse type sensors shown in FIG. 3 may be replaced by latch type sensors, microelectromechanical systems, shape memory alloys, and the like.

In another embodiment of the present invention, fuses are incorporated in the microchip, either externally or internally, and may act to change the coded baseband signal directly. This advantageously allows the state change is expressed as a unique code (rather than a subtle change) that can be easily read by the interrogator. However, this approach requires access to the microchip circuit and may necessitate a custom chip design. In a specific embodiment, a memory, which loses its charge, is used as a sensor. In this case, the geometry and material doping of the memory are designed such that leakage current during thermal exposure is sufficient to drain charge from the device. Applying a high voltage pulse will reset the memory.

In a simple form, the physical or chemical event is recorded by changing a "1" to a "0" or vice versa. The information recorded (whether a single bit, multiple bits, or some other information) when the event occurs can be used in two ways. First, it can be used "directly" by appending to the RFID code such that the reader obtains ID data followed by sensor data. Second, it can be used "indirectly" by selecting one of two codes; that is a particular recording device #137 could respond with code #137a if the device is normal and code #137b if the device experienced the event under consideration. From a communication theory point of view, these two codes may be orthogonal or nearly orthogonal so that the reader has a very high probability of distinguishing between a normal device and a transformed device.

In another embodiment, a silicon-based microelectromechanical system (MEMS) may be employed. Such MEMS are seeing increased usage as sensor and actuator systems in a variety of industries. MEMS are small devices integrated onto a microchip that may serve as pressure sensors, accelerometers, strain gauges, electrostatic actuators, microswitches, torsional mirrors, etc. These functions result from various MEMs structures and properties such as capacitance, temperature-dependent semiconductor activity, electrostatics, Hall effect, magnetostriction, piezoelectric effects, piezoresistance effects, etc. For example, a pressure sensor can be implemented in a MEM device in conjunction with a switch. At the over-limit condition, the deflection of a membrane could be used to close a circuit, thus discharging energy or recording the event. Exemplary MEMs temperature sensors include infrared detectors and thermocouples.

Another form of sensor applicable for use in a wireless threshold recording device is a shape-memory alloy. These alloys, consisting of nickel-titanium alloys (NiTiNOL) for example, have seen extensive use in aerospace and biomedical applications. Shape-memory alloys have the ability to be deformed easily at low temperatures. At high temperatures, above a well-defined transformation temperature for example, the material returns to its original shape, often exerting a substantial force. This repeatable transition makes these materials suitable for temperature threshold sensors and memory devices. Alternatively, resistive heating may be used to control actuation while transformation temperatures can be flexibly tailored to specific applications by varying the alloy composition.

Figure 4A:
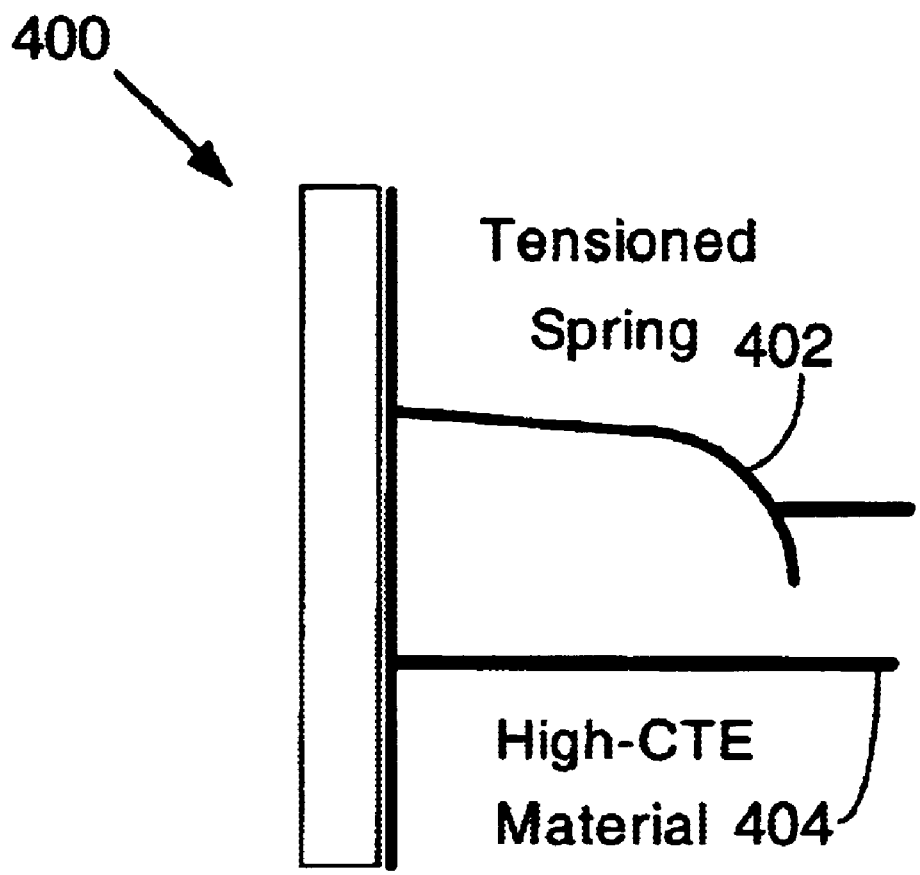
FIG. 4A illustrates a conceptual diagram of an exemplary mechanical latching over-temperature sensor for use in a temperature over-limit application.

FIG. 4A illustrates an exemplary mechanical latching over-temperature sensor 400. The term "latching" may be described as a mechanical or electrical switch that remains in its switched state after the event. The latching sensor 400 remains in its switched state until external reset to its initial state. Latching sensor functions may generally include (1) storing energy, (2) switching when the physical or chemical event occurs or state is sensed, and (3) resetting to record another event.

For exemplary mechanical latching over-temperature sensor 400, the energy storage is tensioned spring 402, which is released when a high coefficient of thermal expansion (high-CTE) material 404 expands sufficiently to release the tensioned spring 402. In an alternate embodiment, a latching system may be implemented in which the release of tensioned spring 402 is determined by expansion of a gas as a result of differential temperatures. For the mechanical latching over-temperature sensor 400, the connection between the spring 402 and the high-CTE material 404 is normally closed below threshold temperatures. Alternately, it is possible for the connection to be normally open below threshold temperatures (for detecting under-temperature limits for example).

Generally, energy-storage devices may be based on, but not limited to, mechanical (such as a spring or flywheel) devices, electrical (such as a capacitor or CMOS memory cell) devices, magnetic devices, chemical (such as temperature rate-dependent phase changes) devices, gravitational potential, etc. Temperature-sensitive switches can be constructed using shape-memory alloys or bimetallic materials, ferrite devices that change magnetic states when the Curie temperature is exceeded, and various semiconductor effects. The reset function of the latching sensor may be implemented manually (a simple switch), electrically (recharging a capacitor) or with a mechanical actuator such as an electromagnet or piezoelectric device.

Figure 4B:
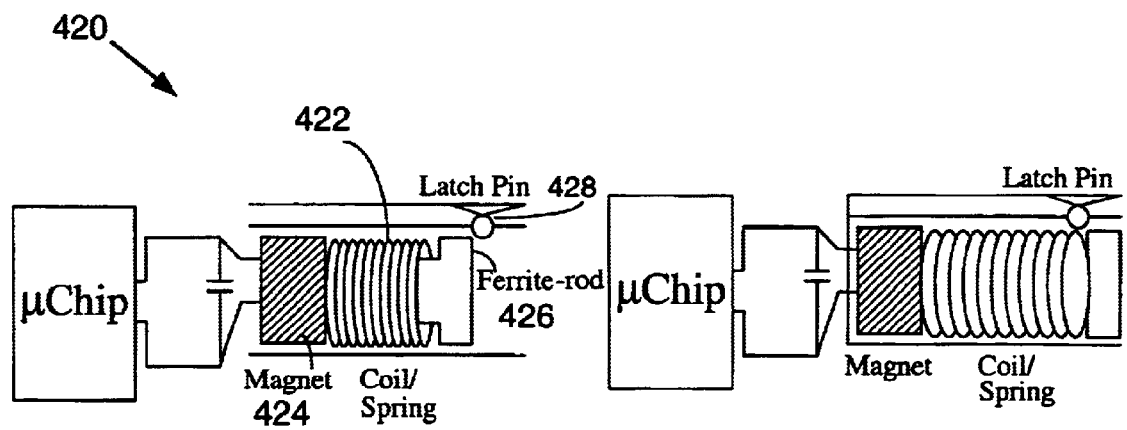
FIG. 4B illustrates an exemplary latching event-recording device of this invention in which the windings of inductor form an antenna that additionally acts as a spring.

FIG. 4B illustrates an exemplary latching event-recording device 420 in which the windings of inductor 422 form an antenna that additionally acts as a spring. A magnet 424 coupled to the inductor 422 acts as the over limit sensor for event-recording device 420. Magnet 424 is demagnetized when the ambient temperature is above the Curie temperature of magnet 424. Subsequently, the force of the coil spring of inductor 422 causes a ferrite-rod 426 and the inductor 422 to expand beyond latch pin 428, thereby changing the inductance of the inductor 422 and consequently shifting the resonant frequency of event-recording device 420.

The event-recording device 420 may also be used as a resetable threshold-recording device. In this embodiment, the magnet 424 is designed to have insufficient force to overcome the latch pin 428 when re-magnetized. Applying a suitable DC magnetic field then externally resets event-recording device 420. This field may be applied, for example, by an interrogator during subsequent inspection. The inductor 422 acts as an electromagnet and the ferrite rod 426 is forced back toward the magnet 424, passing beyond the latch pin 428. In this manner, event-recording device 420 provides an exemplary case of a unidirectional threshold sensor wherein a resetable sensor passively records an event and the quantity being measured is unable to reset the sensor. Advantageously in this case, space and weight savings are gained by dually implementing the inductor 424 windings that surround the ferrite rod 426 as an antenna and a spring.

In another embodiment, the magnet 424 of event-recording device 420 may be removed and the compressed coil spring could be constructed using a high-temperature (ternary) shape-memory alloy. At an appropriate transformation temperature the shape-memory alloy coil relaxes, forcing the ferrite rod 426 and inductor 422 beyond the latch pin 428. In addition, a second latch pin or stop could be used to prevent over-extension if necessary. Similarly, application of an external DC magnetic field may be used to force the ferrite rod back to its original position, re-compressing the inductor, and resetting the event-recording device.

Figure 4C:
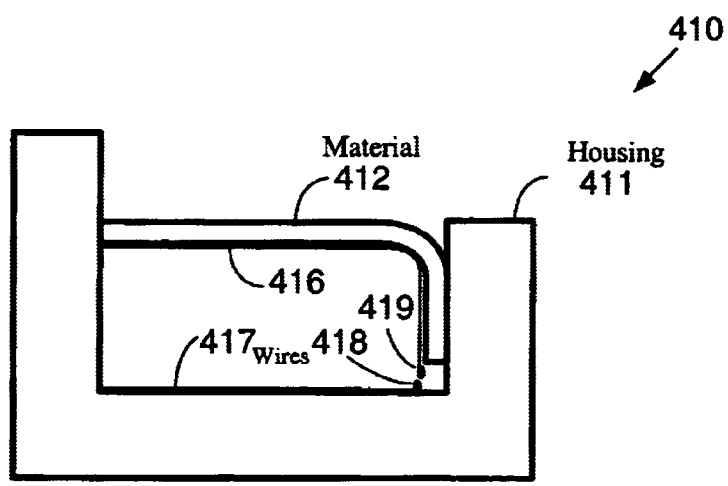
FIG. 4C illustrates an exemplary mechanical latching over-temperature sensor which is normally open.

FIG. 4C illustrates an exemplary mechanical latching over-temperature sensor 400, which is normally open. In this case, a high-CTE material 412 is guided by housing 411. Upon reaching a threshold temperature, the high-CTE material 412 expands sufficiently to close the contacts 418 and 419. The contacts 418 and 419 each respectively correspond to wires 416 and 417 which provide electrical communication with the remainder of the wireless recording sensor. While a latching mechanism is not illustrated for the sake of simplifying the diagram, such mechanism could assume a number of different forms including a tooth in housing 411 that engages a notch in material 412.

The present invention may also include multiple latching mechanisms for recording more than one event per device. Such devices may be valuable in applications where the event does not require replacement of the RFID device or it is difficult to remove a single use RFID device. As will be explained below, the device may not require physical alteration before application to record another event or events. The multiple latching mechanisms may also permit testing before application to ensure operability.

Figure 4D:
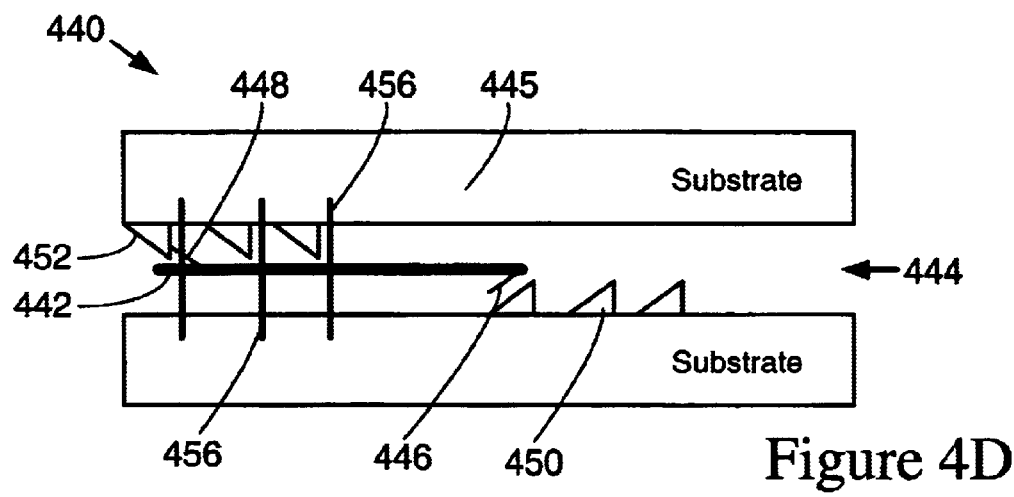
FIGS. 4D–F illustrate an exemplary multiple latching device which uses a logical reset between events instead of external physical reset in accordance with one embodiment of the present invention.
Figure 4E:
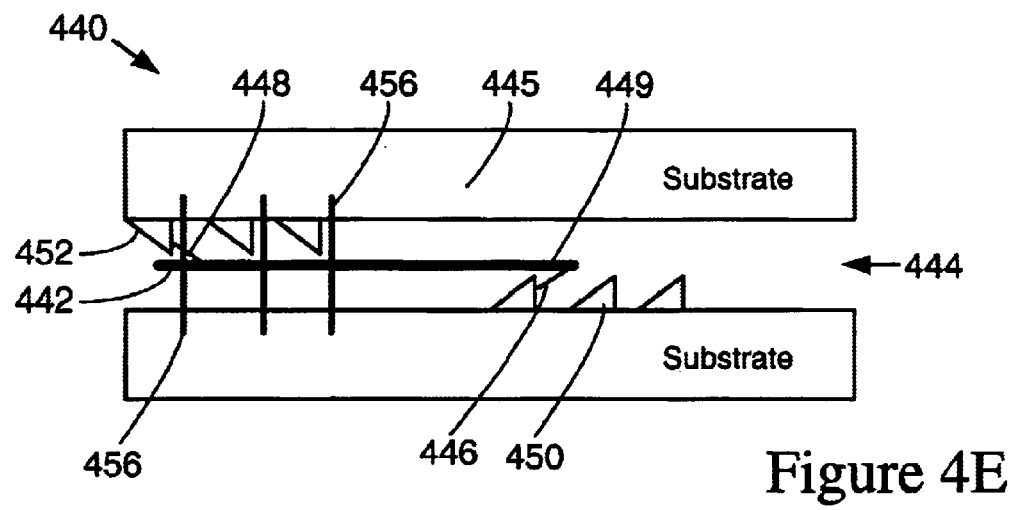
Figure 4F:
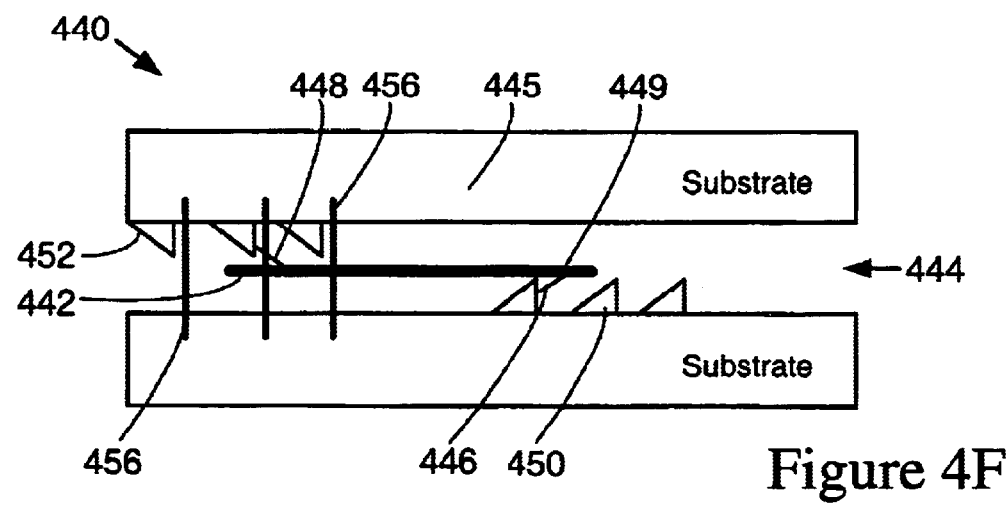

FIGS. 4D–4F illustrate an exemplary multiple latching device 440 which uses a logical reset between events instead of external physical reset in accordance with one embodiment of the present invention. The multiple latching device 440 includes a bar 442 slidably situated within an etched channel 444 of a substrate 445. The bar 442—which serves as the sensor for the multiple latching device 440—has dimensions and a coefficient of thermal expansion such that predetermined strain changes signal temperature threshold events. In one embodiment, the bar 442 has a CTE substantially greater than that of the substrate 445. To record one or more events after occurrence, the bar 442 includes hooks 446 and 448 for latching onto stops 450 and 452 respectively. Thus, as the bar 442 heats, a first end 449 is free to expand longitudinally and the hook 446 latches onto the one of the stops 450 (FIG. 4E). The hook 448 and the stops 450 prevent the bar 442 from returning to a previous state. Upon cooling, a second end 454 is free to contract and the hook 448 latches onto one of the stops 452 (FIG. 4F).

To communicate one or more events, the multiple latching device 440 includes wires 456. In one embodiment, the wires 456 are initially in contact with the bar 442 and both are included in a resonance circuit leg of an RFID device. As the bar 442 moves forward, it breaks contact with one or more of the wires 456 and changes the resonant frequency of the RFID device. In another embodiment, the open/closed circuit status changes the memory address of an ID code for the RFID device. Upon interrogation, the RFID would respond with a different code for each position or state of the bar 442.

The multiple latching device 440 may record multiple events. In one embodiment, the multiple latching device 440 may record multiple events that separately occur between two interrogations. For example, the multiple latching device 440 may be implemented to record two temperature thresholds during a single flight of an RLV. The two temperature thresholds may be different temperatures corresponding to separate events or may be the same temperature threshold occurring twice. The multiple latching device 440 may also record multiple events over numerous interrogations. For example, the multiple latching device 440 may be implemented to record the same over-temperature event for numerous flights of an RLV.

To determine if an event has occurred, and to distinguish between different events, the multiple latching device 440 uses a logical analysis and reset. Before monitoring, the state of the multiple latching device 440 is electronically stored (e.g., in memory) according to its ID. Upon interrogation of the multiple latching device 440, an event is determined based on comparison between its current state and its last recorded state in memory. "No event" is therefor associated with no change from the last recorded state. If an event is detected, the last recorded state of the multiple latching device 440 in memory is updated.

The state of each device in an array of devices may be independently assessed by the interrogator using any logical assessment technique. By way of example, an array of multiple latching devices 440 may be used in numerous trips for the TPS example described. The status of each device may then be determined based on a comparison of its current status and the last recorded status of each device as stored in a database according to device ID. As an illustrative example, the array of devices may all start at state zero. For interrogation after the first trip, state zero would correspond to no event and state one would correspond to a recorded event. For those devices in which an event was recorded, the database would be updated. Successive interrogations for each device in the array may differ. For those devices 440 which recorded an event in the first trip, information recorded after the first trip would be used in interrogation after a second trip. More specifically, state one would correspond to no event and state two would correspond to a recorded event. For those devices 440 which did not record an event in the first trip, interrogation recorded after the second trip would be similar to the first trip. More specifically, state zero would correspond to no event and state one would correspond to a recorded event.

After a third or further trips, a similar analysis would take place for each sensor. For those devices 440 which recorded two events in one or more previous trips, state two would correspond to no event and state three would correspond to a recorded event. Similarly, for those devices 440 which recorded one event in a previous trip, state one would correspond to no event and state two would correspond to a recorded event.

The distance between two adjacent stops 450 may be flexibly determined based on an application. In one specific embodiment for detecting the same event multiple times, the distance between two adjacent stops 450 is set in increments based on the event. In a specific embodiment, the bar 442 is made of aluminum and has a coefficient of thermal expansion in the range of about 25 ppm/degrees Celsius. Thus, a bar 2 millimeters long would cause an expansion of 2.5 macrons every 50 degrees Celsius. For an event of reaching 200 degrees Celsius above resting temperature, the distance between two adjacent stops 450 would be 10 microns. In another specific embodiment, the silicon substrate 445 is provided by a MEMS process and includes a latch points with 2–2.5 micron spacing. In this case, the bar 442 and the distance between two adjacent stops 450 is determined by the grid. Obviously other process technologies and substrates may be employed. Silicon will often be convenient because readily available processes can incorporate logic for analyzing and storing information from latch 440.

In another embodiment for detecting different events, the distance between two adjacent stops 450 is set in increments chosen to detect the different events. For example, the distances may correspond to increments of 50 degrees Celsius for detecting events of 200 and 300 degrees Celsius above resting temperature. For either event, interrogation of the multiple latching device 440 includes a reading of the current state of the device and a logical comparison to the most recently stored state of the device. More specifically, for interrogation after a first RLV trip as described above with a device starting at state zero, state zero would correspond to no event, state one would correspond to a first temperature event and state two would correspond to a second temperature event. For any device in the array which recorded either temperature event in the first trip, the most recent state of the device would be updated in memory.

Incremental states may also permit segmentation of over-limit conditions, thereby providing additional detail and finer resolution of an over-limit condition. Alternatively, multiple states may be used to signal RFID device operability during the time in which an event may occur. By way of example, an RFID device used in a TPS application may have three states and may advance one state during normal reentry and two states for a particular over-limit condition. In another embodiment, the bar 442 is replaced with a pneumatic cylinder. On heating, the cylinder expands to predetermined positions which may be suitably latched in position. The pneumatic cylinder may have larger deflections than the bar 442 for similar temperature ranges and thus enable greater resolution.

The multiple latching device 440 may be implemented for a predetermined number of state changes and events. This number of events may be determined according to the distance between stops 450 and the size of the device. By way of example, the latching device 440 may be designed to record eighty events used for any number of interrogations and TPS missions. For the aluminum bar 442 described above, a device for recording eighty events could be less than 1 millimeter.

Figure 4G:
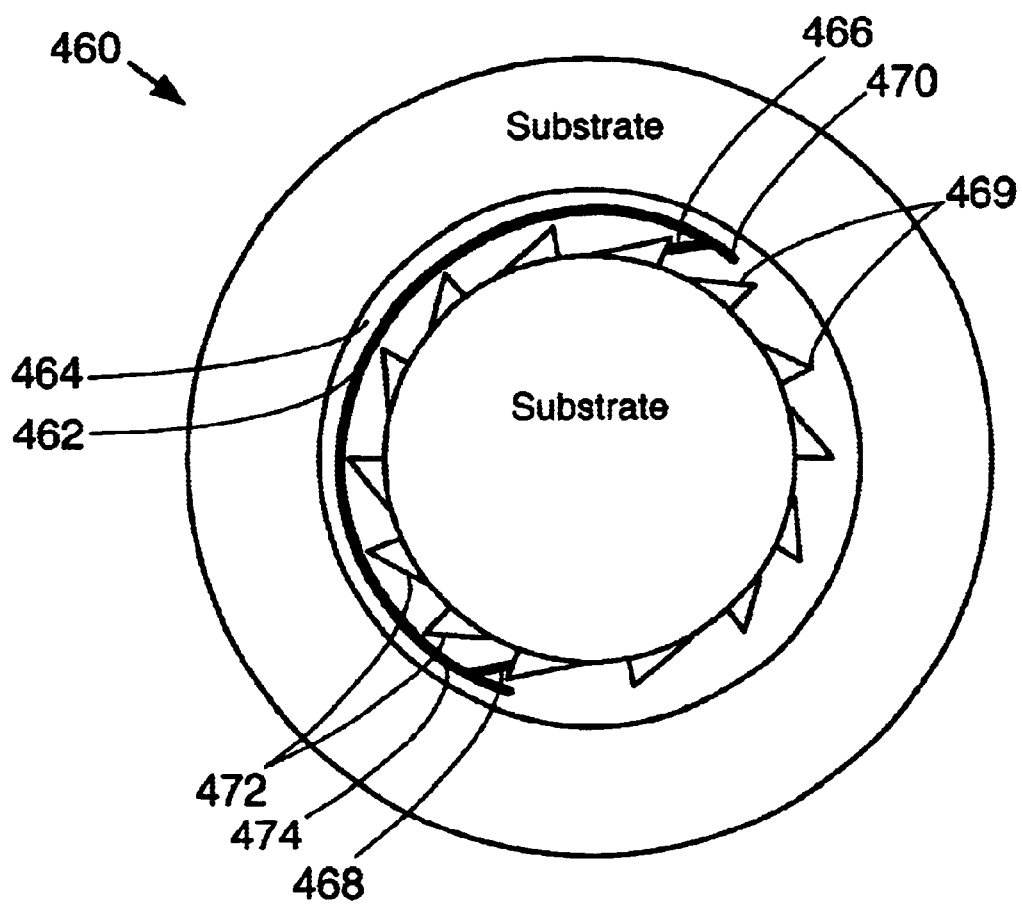
FIG. 4G illustrates another embodiment of the present invention in which a circular geometry is used in a reusable recording mechanism.

FIG. 4G illustrates another embodiment of the present invention in which a circular geometry is used in a recycling or reusable recording mechanism 460. The reusable recording mechanism 460 may record any number of events and is not limited to a predetermined number. The mechanism 460 includes a curved bar 462 slidably situated within a circular groove 464. The curved bar 462 has dimensions and a coefficient of thermal expansion such that predetermined strain changes signal temperature threshold events. To maintain a threshold after occurrence the one or more threshold temperatures, the curved bar 462 includes hooks 466 and 468 for latching onto stops 470 and 472 respectively. Thus, as the curved bar 462 heats, a first end 469 is free to expand and the hook 468 latches onto the one of the stops 470. The hook 466 and the stops 470 prevent the curved bar 462 from returning to a previous state. Upon cooling, a second end 474 is free to contract and the hook 468 latches onto one of the stops 472.

The stops 470 and 472 are preferably continuous in the circular groove 464. The position of each hook 466 and 468—and state of the reusable recording mechanism 460—is then determined by electrical communication with each stop and logical analysis by the interrogator. The number of stops 470 and 472 may vary with an application. By way of example, for diameter of 1.3 mm and a stop 470 spacing of 8 microns, the reusable recording mechanism 460 may have 250 stops 470 and 472. The curved bar 462 would may flexibly sized according to the groove and the sensing requirements of an application.

For continuous stops 470 and 472 in the circular groove 464, the reusable recording mechanism 460 allows states to be recycled. Extending the previous example of an interrogator which performs a logical analysis of each device after an RLV trip to a circular (or any other reusable) recording device having three stops, the states can be logically recycled to record more than three events. After a fourth trip, for interrogator would compare the current state of each device with its last recorded state in memory. Again, interrogation for each device in the array may differ based on prior performance. After a fourth trip, for those devices 440 which previously recorded three events, state three would correspond to no event and state zero would correspond to a recorded event. Similar to previous interrogations, for those devices 440 which recorded one event in a previous trip, state one would correspond to no event and state two would correspond to a recorded event. After the fifth trip, for those devices 440 which recorded four events, state zero would correspond to no event and state one would correspond to a recorded event (similar to a device which recorded no previous events). Thus, using circular (or any other reusable) recording device, a device could be designed for an open number of events or interrogations.

Having briefly discussed the above latching mechanisms, several alterations may be implemented to vary the performance of the devices depending on an application. By way of example, although the latching mechanisms have been described primarily with respect to a single bar as a sensor, multiple bars may be used in any of the above devices to provide redundancy. Alternatively, a Vernier system may be implemented to increase the sensitivity of the bar 360.

Figure 4H:
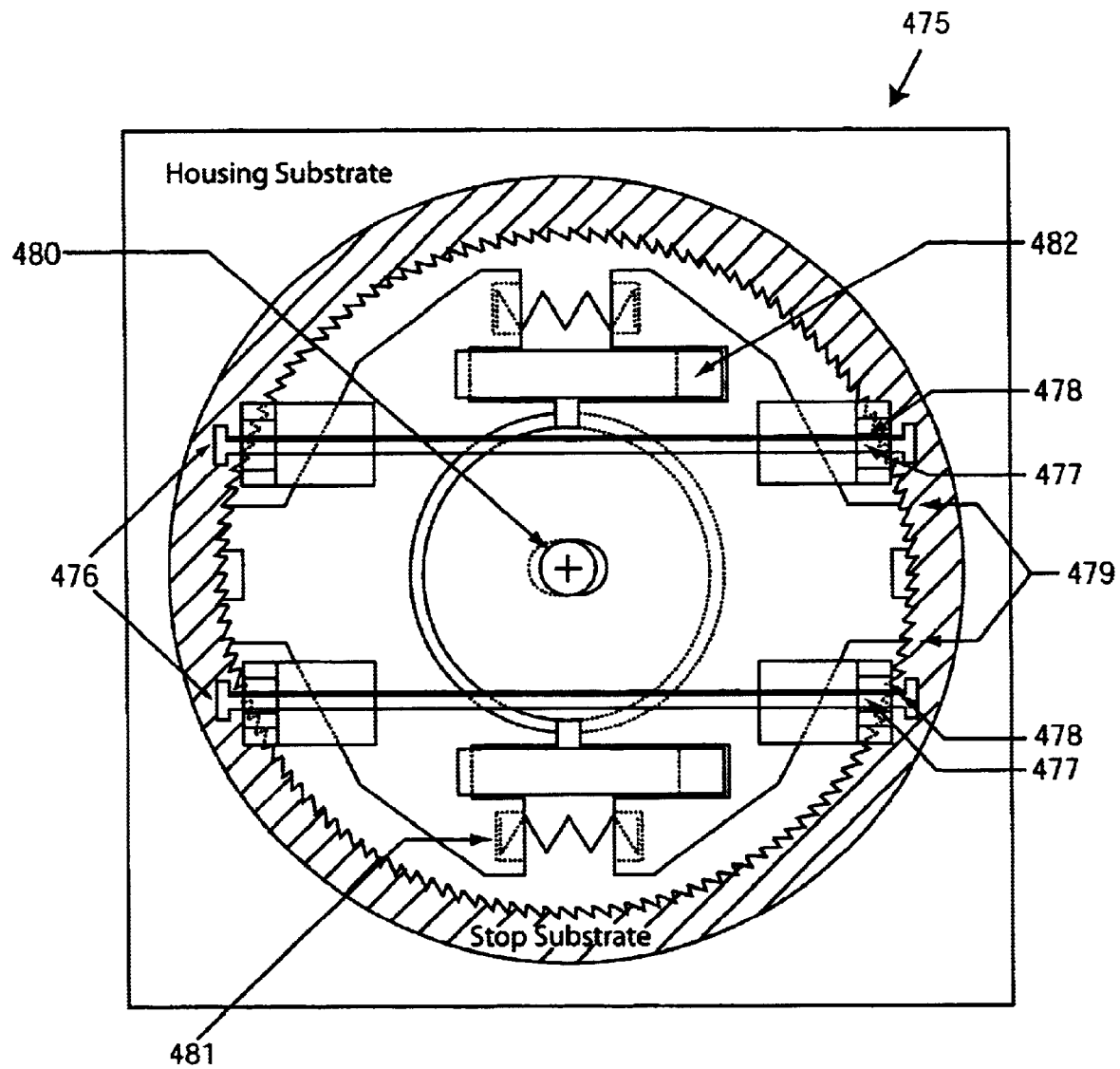
FIG. 4H illustrates a bi-metal ratchet for multiple temperature event recording in accordance with another embodiment of the present invention.

FIG. 4H illustrates a bi-metal ratchet 475 for temperature event recording in accordance with another embodiment of the present invention. The bi-metal ratchet 475 is based on the deflection of two cantilevered beams 476, each including a high CTE beam 477 and a low CTE beam 478. The cantilevered beam 476 deflects in the direction of the lower CTE material when heated. Stops 479 are used to latch the cantilevered beam 476 in advanced positions as a result of one or more over-temperature conditions. Ratcheting motion is provided by an underlying wheel 480, which advances to straighten the cantilevered beam 476 when the bi-metal ratchet 475 is cooled.

The bi-metal ratchet 475 may also include a spring-lock mechanism 481 to pre-load the system. This pre-load may be useful for resistance against shock, vibration, acceleration and deceleration, for example. Further, the bi-metal ratchet 475 may also include a lock mechanism 482 to prevent unintended ratcheting at low temperatures. The lock mechanism 482 prevents the cantilevered beam 476 from deflecting in the direction of the high CTE material.

Certain conventional latching over-limit sensors may be used with this invention. Conventional temperature over-limit latching devices include sensors in smoke alarms and cooking pop-up thermometers. Other latching devices may include an over-stress sensor, a fatigue sensor, and a corrosion sensor. Although conventional forms of these devices are typically too large and unwieldy for many event-recording device applications, the invention is broadly applicable to multiple wireless over-limit sensors in general and may include applications of conventional sensors.

Figure 4I:
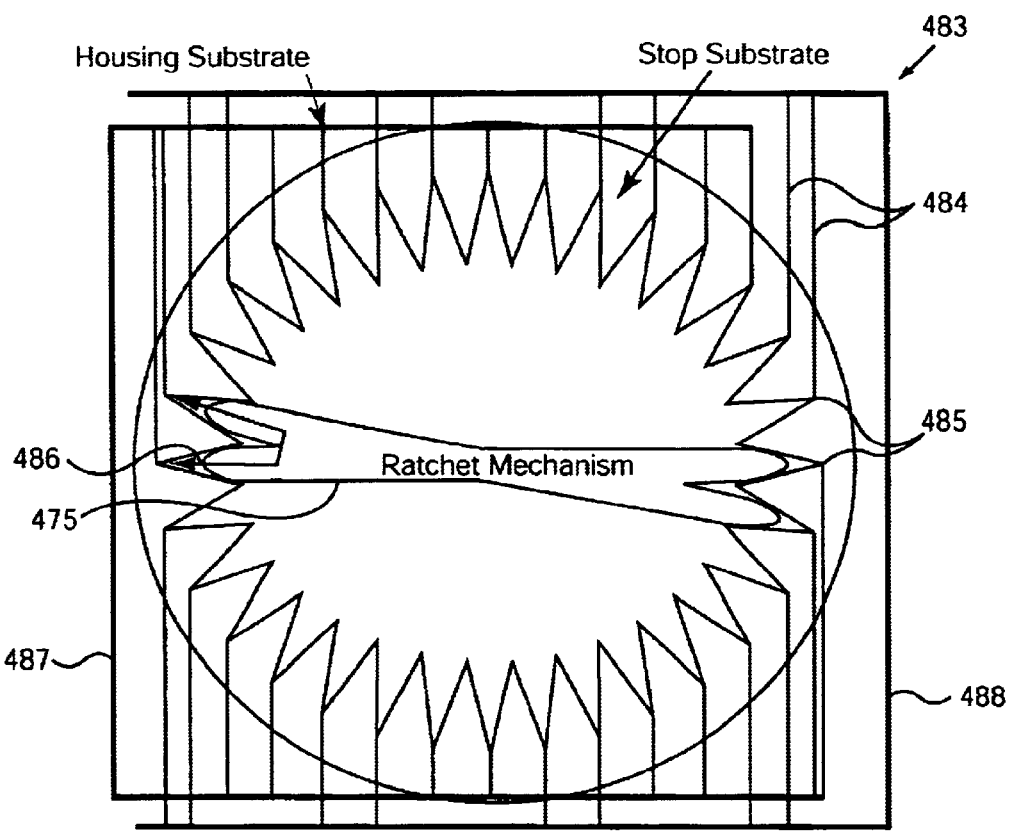
FIG. 4I illustrates an exemplary two-state readout design suitable for use with the bi-metal ratchet in accordance with one embodiment of the present invention.

Another specific latching moisture sensor includes a sponge. When the sponge is dry, an attached circuit is closed. When moisture is added, the sponge expands and breaks the circuit. Alternatively, alternate circuit conditions may be used. For example, a metal contact attached to a dry sponge closes a circuit when the sponge expands from exposure to moisture. The multiple latching RFID devices of the present invention may use a wide variety of mechanisms to convert the stored event or events into a state specific electrical representation. FIG. 4I illustrates an exemplary two-state readout design 483 suitable for use with the bi-metal ratchet 475 in accordance with one embodiment of the present invention. The two-state readout design 483 includes leads 484 to each resting point 485 between stops 479 of the bi-metal ratchet 475. The bi-metal ratchet 475 includes a jumper 486 to open or close a circuit connected through adjacent resting points 485. The two-state readout design 483 may continuously specify one of two states. The first state corresponds to connection between circuit A 487 and circuit B 488. The second state corresponds to no connection between circuit A 487 and circuit B 488. In one specific embodiment, circuit A 487 represents the address-line input to an RFID device and circuit B 488 represents output, either shorted or open. Thus, a closed connection will enable a logic level HI to activate a particular address. Alternatively, an open circuit forces a high-impedance connection.

Figure 4J:
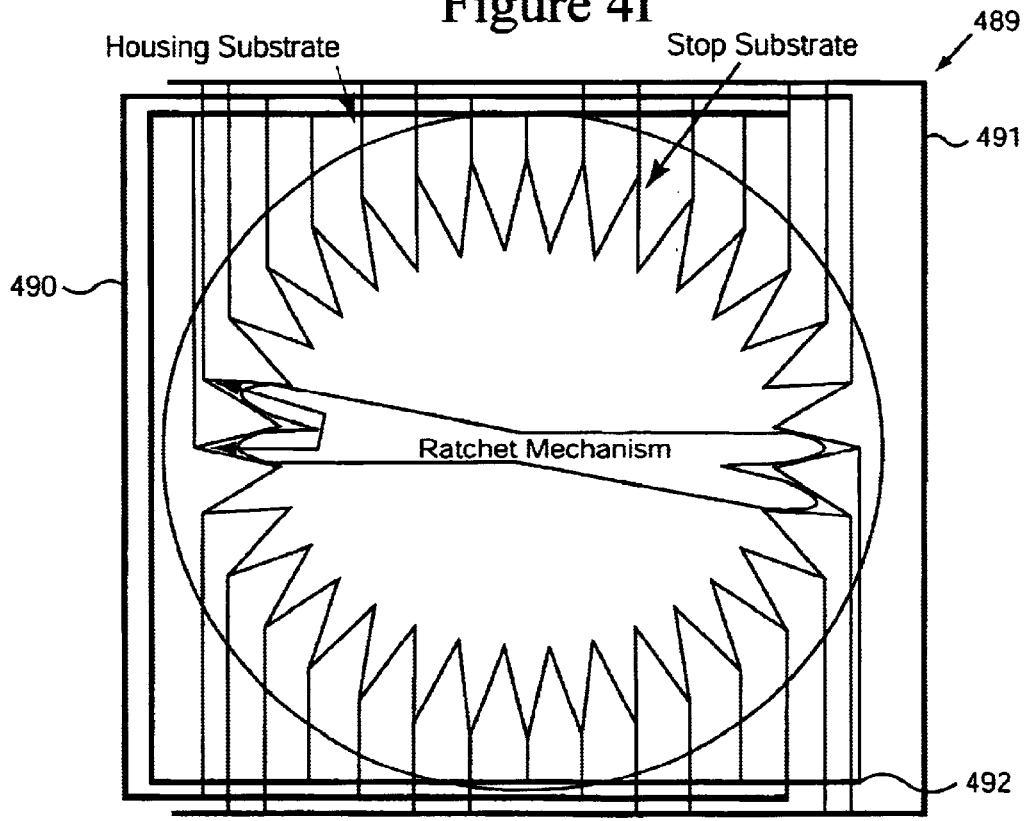
FIG. 4J illustrates a three-state readout design suitable for use with the bi-metal ratchet in accordance with one embodiment of the present invention.

FIG. 4J illustrates a three-state readout design 489 suitable for use with the bi-metal ratchet 475 in accordance with one embodiment of the present invention. The three-state readout design 489 may continuously specify one of three states and has a number of stops which is a multiple of three. The first state corresponds to connection between circuit A 490 and circuit B 491. The second state corresponds to connection between circuit B 491 and circuit C 492. The second state corresponds to connection between circuit C 492 and circuit A 490. In one specific embodiment, circuit A 490 represents the address-line input to an RFID device and both circuit B 491 and circuit C 492 represent output, either of which may be shorted or open.

In one embodiment, event-recording uses changing logic within an RFID device instead of changing the RF resonant frequency of the device. In this case, a fuse, circuit breaker or any other voltage varying sensor may be added to an address line leading to the memory of the RFID device. When the sensor is tripped, the memory is changed and records the event.

Figure 4K:
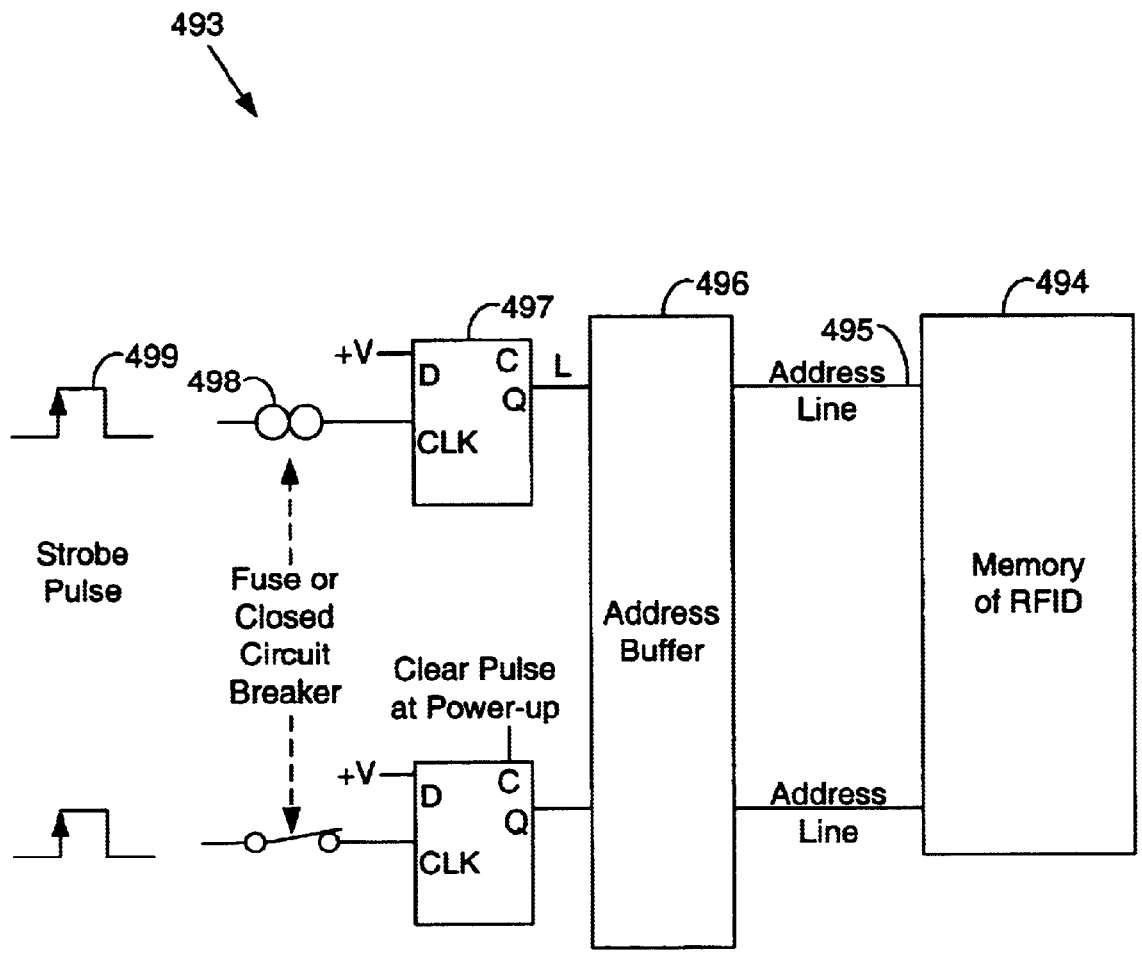
FIG. 4K illustrates an event recording circuit in accordance with a specific embodiment of the invention.

FIG. 4K illustrates an event recording circuit 493 in accordance with a specific embodiment of the invention. The event recording circuit 493 includes a memory 494 used in an RFID device. The event recording circuit 493 has one or more address lines for recording one or more events. An address line 495 leads to an address buffer 496 and further connected to a flip flop 497 and a fuse 498. If a clock trigger pulse 499 passes through the circuit 493, the flip flop 497 will change its state, latching a "1" or "0" into the address buffer 496, depending on the state of the sensor. In another embodiment, the capacitively coupled connection is part of a simple R-C or L-C lowpass filter network. A two-input comparator or Schmitt-trigger device would compare signals passed through a mechanical ratchet with a reference signal. Depending on the time constant of the circuit (which changes based on the sensor state and capacitance value), the comparator would latch to a logic Hi or LO, providing a digital indication of sensor state.

8. Interrogators

An interrogator is used to probe a recording device of this invention. The interrogator provides a wireless probe signal that triggers the sensor device to respond with its identity and the state of its recording mechanism (i.e., whether the one or more physical or chemical events of interest has been detected). In a preferred embodiment, the signal provided by the interrogator also provides the energy necessary for the recording device to reply. The interrogator may be able to detect the reply and present that reply to a computer system or an individual conducting the analysis. Note that devices performing the functions of (1) energizing the event-recording device and (2) communicating with the recording device can be physically separate. They may use different signals for example.

As mentioned above, the wireless interrogation probe may take many different forms such as an RF signal, a microwave signal, a light beam, an electric or magnetic field, etc. The transponder of the recording device must be designed to respond to type of signal provided by the interrogator. While it will often be convenient to design the interrogator and the sensor's transponder to send signals of the same type (e.g., both send RF signals), this is not a requirement of the invention. For example, the interrogator may provide a low-frequency magnetic field as a probe and the transponder may deliver the sensor information via a microwave signal.

Figure 5A:
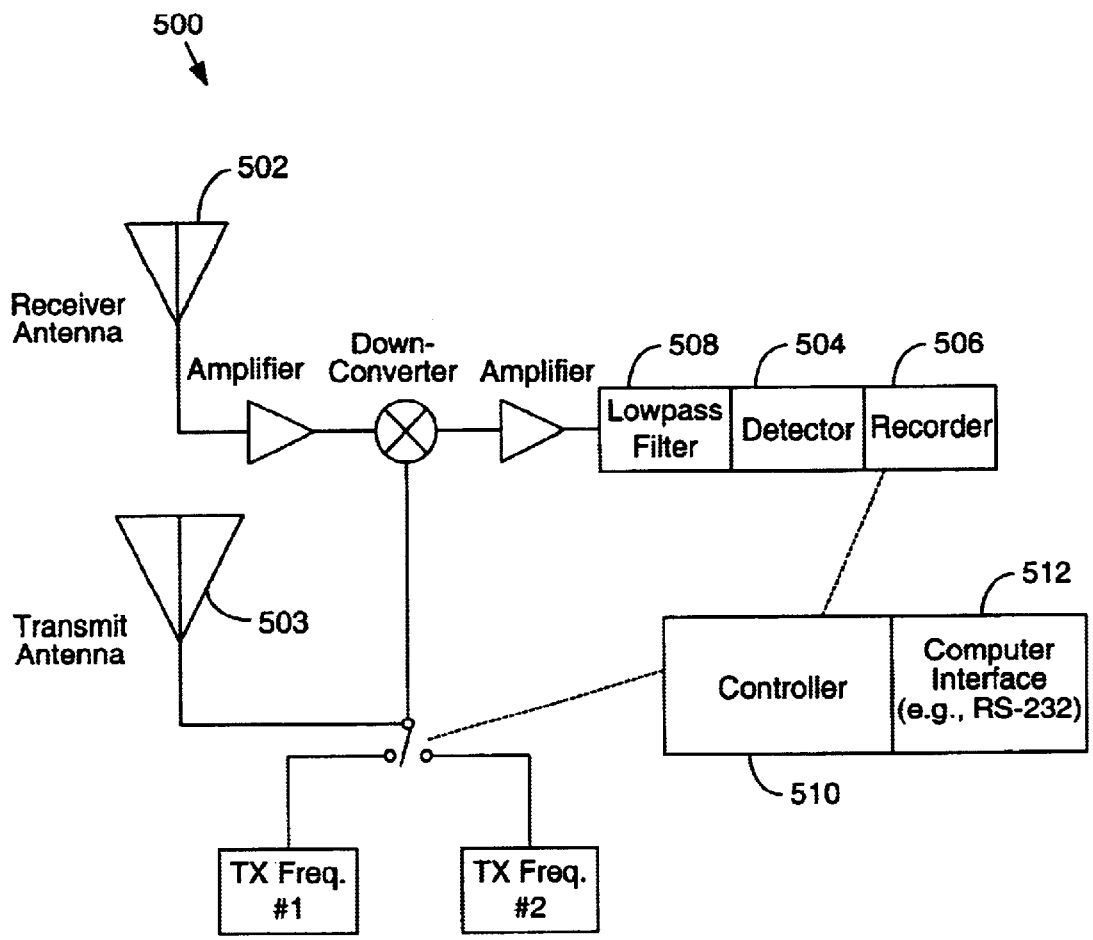
FIG. 5A illustrates, in accordance with one embodiment of the present invention, an exemplary block diagram corresponding to an interrogator.

An interrogator provides a probing signal (and power) to a recording sensor device. Preferably the interrogator includes sufficient radiated power to energize the device at the desired read rates, sufficient bandwidth to interrogate the device in a reasonable amount of time, sufficient sensitivity to accurately obtain the device response, sufficient specificity to discriminate between nearby devices (if desired based on the application), a suitable interface to a computer to record and update a database of device history, a suitable size/weight/power limitation, suitable read range, and safety. An interrogator can accomplish the first task by transmitting an electromagnetic (DC, wave or field) or acoustic signal in the form of continuous wave, pulsed cir wave, chirped waveform, spread-spectrum waveform, impulse, or coded waveform to energize the tag. A specific embodiment employs a commercial product such as that supplied by Biomark (Destron) with modification to monitor sensed events. FIG. 5A illustrates, in accordance with one embodiment of the present invention, an exemplary reader block diagram corresponding to an interrogator 500. Interrogator 500 includes a receiver antenna 502 that is capable of receiving the resonant frequency of the one or more event-recording devices it is polling. The interrogator 500 also includes a transmit antenna 503 that is capable of sending a suitable signal to the one or more devices it is polling. The transmit antenna 503 and the receiver antenna 502 may be combined if suitable isolation circuitry is used. The transmit frequency used to query the tag may also be used as a local oscillator in the homodyne receiver as illustrated. As mentioned in the description of FIG. 3, a passive event-recording device may rectify an incident RF signal coming from interrogator 500 to provide DC power for the microchip 342.

Once the microchip is activated, it modulates the incident carrier with the proper ID code and provides a modulated backscatter signal. The response signal may be at a frequency different from that of the incident signal. A remote receiver detector 504, which may be coupled to the interrogator, detects this modulated backscattered signal and records the ID information using recorder 506. Interrogator 500 may be used in conjunction with RFID event-recording device 220 for example, in which the event-recording device is capable of providing a differential frequency response for varying memory states of the event-recording device 220. In this case, interrogator 500 is capable of receiving at a plurality of resonant frequencies (e.g., 103 kHz and 156 kHz). In addition, interrogator 500 includes one or more lowpass filters 508 as well as the detector 504 which are coupled to controller 510 and computer interface 512, all of which function to determine what state a probed event-recording device is in. The criteria for detecting an event may vary. In one embodiment for interrogating a single event per device using a resonance frequency shift, a first frequency corresponding to no event is used to probe the devices. Any devices which do not respond at the first frequency, either from recording an event or from failure as a result of surpassing design limits—such as burning, may indicate tile damage.

In one embodiment, the interrogator 500 detects events recorded by a resonant frequency shift in a transponder antenna associated with a tag. The interrogator 500 queries (and powers) one or more devices at a first frequency (for example 156 kHz). A device that responds to communication at this frequency (at a standard read range) is indicative of a recorded event. The interrogator receiver detects this transponded signal and records it in memory. Then, the interrogator queries (and powers) one or more devices at a second frequency (for example 103 kHz). Tags that respond to this communication (at a standard read range) indicate that an anticipated event did not occur. Alternatively, recorded events that alter the transponded bit stream do not require modification of the RF carrier frequency of the interrogator.

The choice of an operating frequency or frequencies may vary widely. For large arrays of RFIDs, regular or slightly modified commercially available equipment may provide cost savings. These devices operate in designated frequency bands such as 125 kHz, 13.56 MHz, 900 MHz, 2.45 GHz and 5.8 GHz. In some cases, RFID technology at 125 kHz is used due to its current maturity. Alternatively, it may be desirable to increase the interrogation frequency to increase the data rate and interrogation speed. Other criteria that may be used to select a frequency include penetration through lossy or conductive media, improved read ranges and weight reduction.

In another embodiment of the present invention, interrogator 500 is configured to interrogate multiple devices simultaneously. In this manner, interrogation of a large number of event-recording devices may be expedited. For example, anti-collision RFIDs or algorithms that improve the ability of the interrogator to read multiple RFID's are also suitable for use with the present invention. By way of example, a time domain multiple access (TDMA) system may be used in which a passive sensor responds with a time delay to interrogation.

In a further embodiment of the present invention, the interrogator is non-stationary and may be transported, on a vehicle during interrogation in the TPS case for example, to increase inspection flexibility. Alternately, for the case of TPS inspection, the interrogator may be portably located on or near the RLV. In yet a further embodiment of the present invention, polling may be performed by a remote interrogator, in which interrogation occurs from a substantially larger range, for example as accomplished by using a circularly polarized multiple-windings helix. For the case of TPS inspection, this advantageously may allow interrogation to occur as the RLV enters the hangar, further reducing turnaround time.

A hand-held interrogator may poll multiple devices simultaneously. This is extendable to a mobile platform. It is also possible to use multiple interrogators to speed inspection. These can be used by multiple operators or distributed around the perimeter of hanger entrance, for example. Regardless of the interrogator used for an application, the interrogator should have a suitable read range for probing the array of devices. By way of example, a hand held interrogator may have a read range from 1 inch to 12 inches. Higher read ranges also permit more devices to be probed simultaneously. Generally speaking, increased read ranges may be obtained by the use of increased interrogator power, increased size of the interrogator transmit antenna, increased size of the tag antenna, low power tag design (such as using components that make use of 3V logic instead of 5 V logic), increased size of the receive antenna, and the use of shielding and interference mitigation strategies to improve reception capabilities. In some cases, certain modulation and coding schemes for transponding data perform better in a noisy environment and these techniques are generally well known to those skilled in the art.

In some environments, measures may need to be taken to isolate the device and the interrogator from electromagnetic interference. One example of such an environment is the interior of a microwave oven. In one embodiment, a device with an integrated microfuse thermal sensor may be used to indicate whether or not a liquid (such as tea or other foodstuffs) has reached a desired temperature (e.g., 85° C.). It is important that microwave energy does not couple to the device, as this could cause self-heating of the device, producing erroneous reading of the temperature in the local environment. This isolation can be accomplished, for example, by constructing a device with a length of 0.5 inches or less. This device is small compared with the microwave wavelength, and therefore microwave coupling to the device is weak. Secondly, the interrogator antenna may be placed within the microwave oven cavity. The interrogator should be isolated from the microwave interference so that the microwave energy does not unnecessarily heat the antenna, so that microwave energy does not interfere with interrogation of the device, and microwave energy does not leak into the environment (health and safety issue). Effective isolation techniques include frequency-selective shielding, interference cancellation (such as the use of twisted wires that self-cancel induced microwave fields-such a twisted pair can be connected in a parallel arrangement and wound as a coil to serve as a transmit and/or receive antenna at 125 kHz, for example), filtering, and the timing of interrogation pulses to occur in between 2450 MHz microwave pulse bursts (the timing of these pulse bursts varies with the power level setting of the microwave oven).

Regardless of the interrogator used, the interrogation process may be tuned to application specific requirements or to overcome application specific obstacles. Such obstacles include narrow-band and broad-band interference. By way of example, for in-flight TPS applications, interference may result from on-board systems and the RFID devices may be modified to overcome this interference. Anticollision interrogation techniques, filtering, shielding, etc can overcome narrow-band interference To overcome weak signal reception from the RFID devices in the presence of strong reader transmission, the interrogator may transmit short pulses and listen for RFID device echo when the transmitter is off. Alternatively, the interrogator may implement a sequence of isolation strategies to separate the receiver from the continuous wave transmission emissions. Physical separation, placement in pattern nulls and orthogonal polarization can achieve separation, for example. Transceiver-receiver isolation may also be achieved by the use of a high dynamic-range amplifier and mixer components and signal subtraction.

Figure 5B:
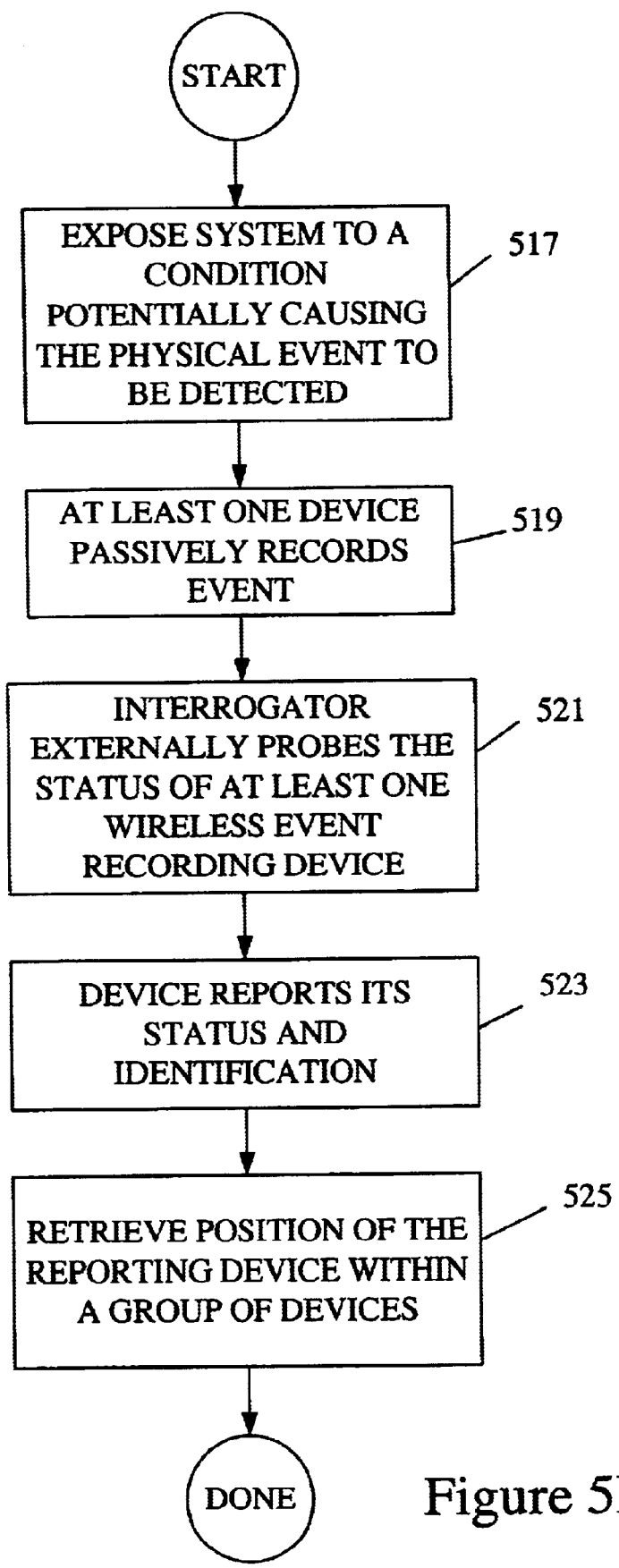
FIG. 5B is a process flow diagram depicting a typical procedure for using the event-recording devices and interrogators of this invention.

The general procedure involved in sensing and interrogation in accordance with this invention is depicted in FIG. 5B. As shown there, the system of interest is first exposed to a condition potentially causing the physical or chemical event to be detected (517). If the system is provided with an array of sensors, the event or condition may be proximate at least one of the recording devices, which detects the physical or chemical event, while other sensors in the array, which are not exposed to the condition, do not detect the event. After a device is exposed to the condition of interest, it passively records the event using its recording mechanism (519).

At some later time, an interrogator externally probes the status of at least one wireless event-recording device (521). In response, the device reports its status and identification (523). The interrogator notes this information for subsequent interpretation.

If the reporting device is one of a group of related devices, the system may retrieve information identifying the spatial or temporal position of the reporting device within the group (525). The retrieved information may be provided in a database in which device location is keyed to device identification (ID tag information). Such a database is depicted within a system 530 in FIG. 5C.

Figure 5C:
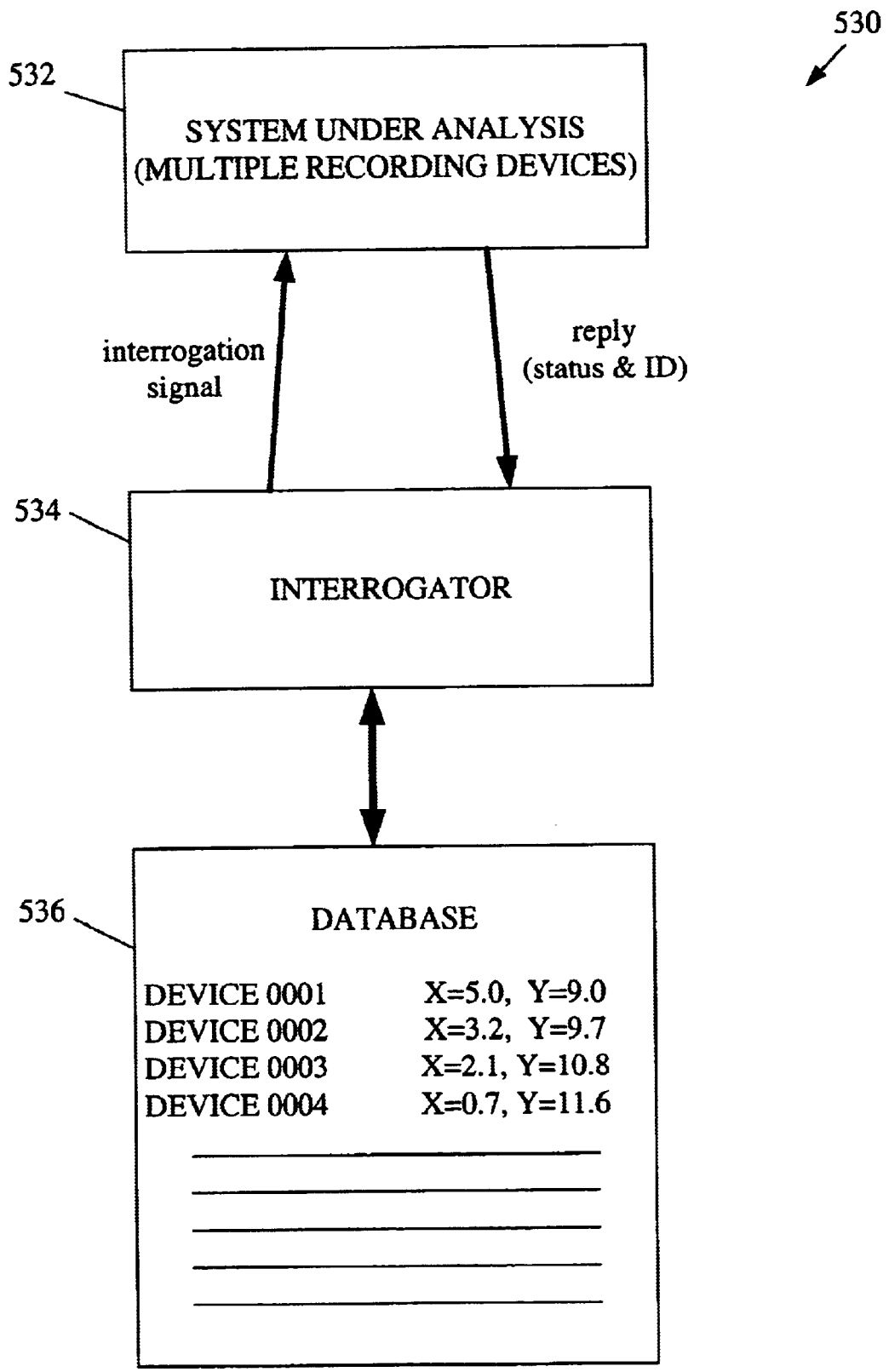
FIG. 5C is a block diagram of a system, including a database of recording device locations, that may be used to implement the present invention.

As shown in FIG. 5C, an interrogator 534 probes one or more event-recording devices 532 (corresponding to 521 in FIG. 5B). At least one event-recording device then replies with its status and ID (corresponding to 523 in FIG. 5C). To determine the location of the responding device, interrogator 534 (or a related system) queries a database 536 containing a list of device IDs and corresponding spatial locations. Database 536 then responds with the location of the device identified in the query. This embodiment is particularly useful when the system includes an array of devices and interrogator must determine which specific device within the array is reporting its status.

Figure 5D:
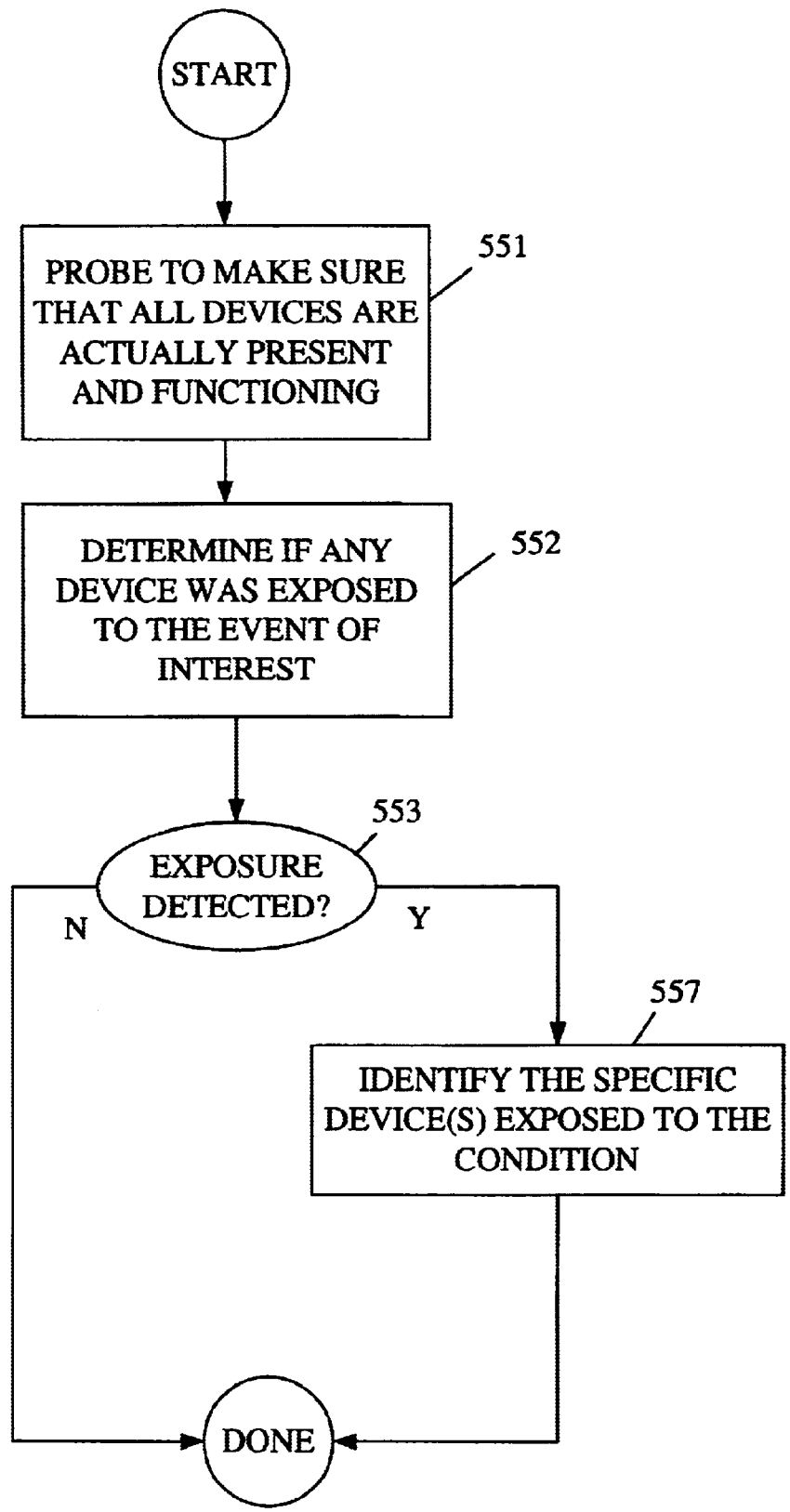
FIG. 5D is a process flow diagram depicting a procedure for rapidly probing an array of event-recording devices in accordance with an embodiment of this invention.

An interrogation process illustrated in FIG. 5D is appropriate for some applications calling for a course inspection of a large structure followed by a fine examination of selected regions. The interrogation process involves a collection of devices (e.g., an array on a large structure with many devices (possibly including diode loaded dipoles) such as a bridge or RLV). Initially, the structure is probed (551) quickly to make sure that all devices are present and actually functioning. Next, the interrogator determines if any of the devices was exposed to the event of interest (552). This procedure may be performed without identifying specific devices in the collection. The interrogating signal may be chosen to identify frequencies that are characteristic of significant events, probing the entire structure (or at least a large region) all at once. The interrogator determines whether a "bad" response was detected (553). If such a bad response is detected, a more detailed inspection may be needed to determine the location of the device. If not (553 answered in the negative), the process is complete. If the procedure finds that at least one device was exposed to the condition of interest (553 answered in the affirmative), then a more involved interrogation is performed (557) to identify the specific device(s) exposed to the condition.

The interrogation process illustrated in FIG. 5D may also include cross-referencing with a database. The database may be useful for storing information for a device based on its ID including the device's physical location or status history. More specifically, when a device may have multiple states which are not reset between successive polling, entries in the database each relating to a single ID may serve as a reference for device status between successive polling. This may aid in determining which devices have been exposed to the one or more events (557). The database (or other storage mechanism) may also maintain a history for the device.

The above approach may be viewed as a "logical" reset process, as opposed to a "physical" reset process. In the latter case, the sensor-recording device must be physically reset after each probe. In the logical reset procedure, a step of storing a current device state replaces the step of physically resetting the device. Often the logical reset process takes place more rapidly and with less energy or overhead than the physical reset process.

Figure 5E:
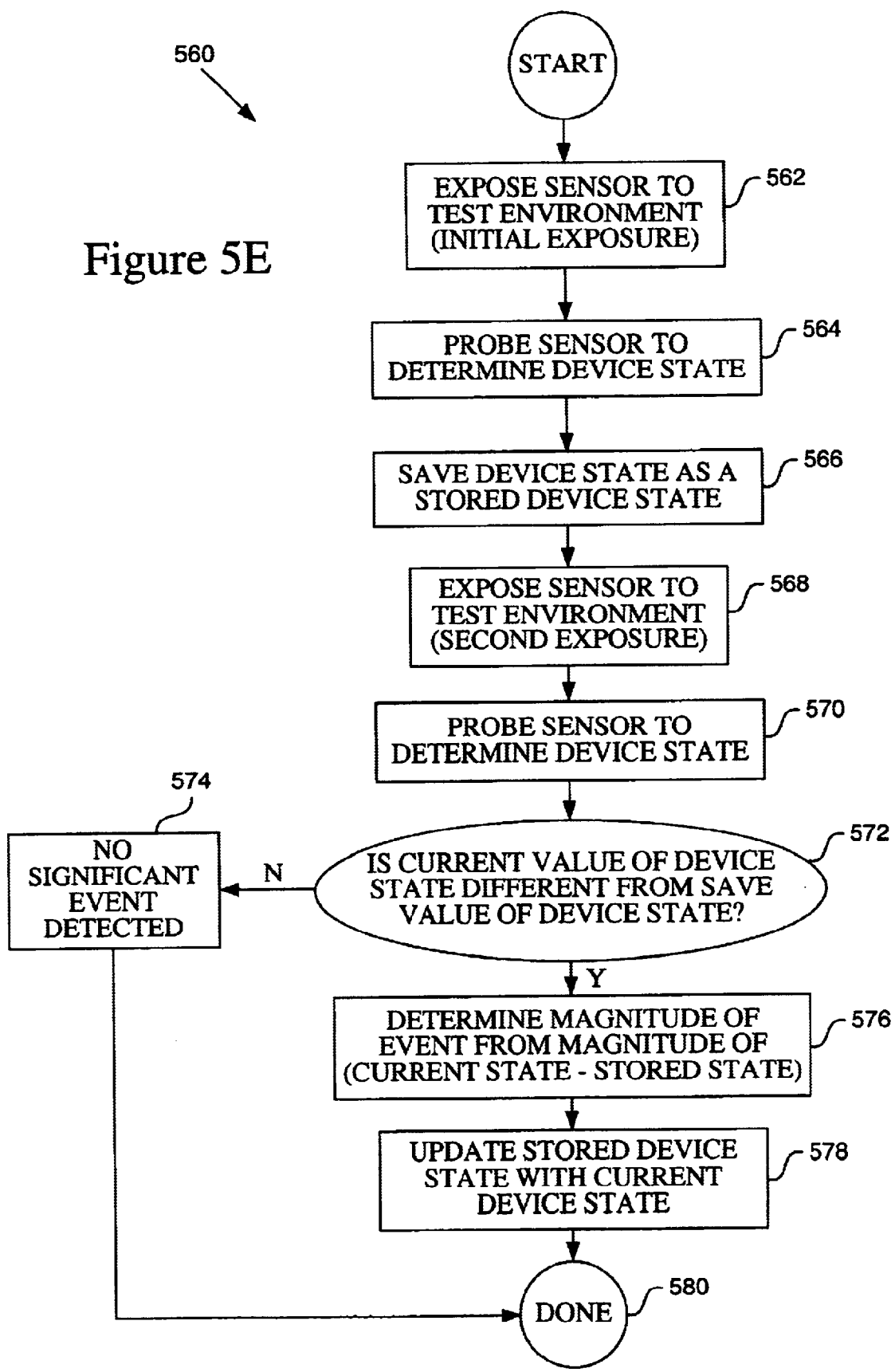
FIG. 5E presents one example of a sequence of operations that may constitute a logical reset procedure.

FIG. 5E presents one example of a sequence of operations that may constitute a logical reset procedure. In the FIGURE, a logical reset process 560 begins at 562 by exposing the sensor device to the test environment of interest (e.g., an RLV reentering the earth's atmosphere). Any of the various devices described above in FIGS. 4A–4K may be employed for example. The device may or may not change state depending upon the conditions that it experiences.

Subsequently, an interrogator probes the sensor device (564) to determine whether it changed state (and therefore experienced a physical or chemical event of interest). After this, the interrogator or associated apparatus saves the current value of the device state as a stored device state (566). As mentioned above, this may involve storing the current device state value in a database. A database is particularly appropriate when an array of sensor devices is probed. The saved value serves as a baseline sensor state for subsequent interrogation.

Later, the sensor device is exposed to a second test environment (568). For example, the sensor may reenter the earth's atmosphere a second time with the RLV. As before, an interrogator probes the sensor to detect any device state change (570). This time, however, the interrogator or associated apparatus determines whether the current value of the device state (as just measured) differs from the stored device value (saved at 566). See decision 572. If the device state has not changed, then no significant event occurred during the second exposure (574). The relevant portion of the process concludes at 580.

If on the hand the device state changed from the stored value, then the interrogator or associated apparatus determines the magnitude of the difference (576). That magnitude determines the magnitude of the physical or chemical event experienced by the sensor device. Remember, that many recording mechanisms include three or more states or a recurring or recycling latching mechanism. Thus, the magnitude of the change—as represented by the device state—can be 1, 2, 3, . . . . Depending upon calibration, the value of that device state change corresponds to a value of chemical or physical state. After the relevant device state change information has been noted, the interrogator or associated apparatus updates the stored device state with the current value of the device state (578). The relevant portion of the logical reset process concludes at 580.

A computer-implemented user interface may be used to improve user analysis of an array of event recording sensors. By way of example, a graphical user interface (GUI) may be used to help inspectors with TPS analysis. The TPS GUI may contain different colors for uninspected devices, inspected devices that recorded a first event, inspected devices that recorded a second event and inspected devices that did not record an event. In addition, the GUI allows the user to point a particular device in an array and obtain information on the device. The information may include the device's ID and any history for the device as stored in a database. Any suitable GUI system suitable for integration with the reader coil may be used. In one specific embodiment, the GUI is implemented on a portable computing device (such as a Palm Pilot (3Com Corporation of Santa Clara, Calif.) or the like) to allow a user to view both the item under inspection and the computer display of the item.

9. Applications

The present invention finds a wide range of applications. The use of an identification code with each recording device allows for probing large or disparate systems having many spatially or temporally separated points to be probed. A preferred embodiment employs an array of recording devices disposed at various locations in a physical system. Another preferred embodiment employs many separate sensors in discrete items that can be analyzed at different times. For example, a production facility may require that finished items be checked one after another on a production line. Recording devices placed in each of these items are interrogated sequentially to determine whether they meet one or more conditions. Alternately, items may be processed through a checkpoint simultaneously for improved speed and failing items may further be inspected subsequently.

In one specific example, milk cartons or other food containers are provided with recording devices of this invention. The sensors may detect whether the food product has spoiled and/or has a threshold concentration of bacteria or other contaminant. More generally, chemical shelf life may be monitored. A production mechanism conveys these containers past an interrogator that probes each one separately. Each container responds with its identification code and its state. If the interrogator finds a problem with any of the containers, it can pass the identification of that container to a mechanism downstream that can pull the problem container from the production lot. Alternately, the status of the containers may be checked on the shelf and containers may be removed as necessary.

In another specific example, packages contain an accelerometer that indicates whether they have been dropped or mishandled. At some point in the route of the package (e.g., a mailed package) from a source to a destination, the accelerometer is probed to identify the package and determine whether it has been accelerated past a threshold acceleration. In a specific embodiment, the sensor is implemented as a smart card affixed to the package. The smart card includes a shock sensor which may break a circuit if it experiences over 100 Gs of acceleration, for example.

There are many passive event recorders that do not make use of wireless communications/power to monitor subsurface events. Many of these could profit from the wireless event-recording devices/methods of this invention. One example is the X-ray radiation badge to monitor exposure (dosimetry) to ionizing radiation. Typically these badges use film to record the event. After a period of time, the exposed badge and a control badge (for background radiation) are processed (developed) to determine if a hazardous exposure event occurred. Other devices make use of thermoluminescence. Some systems use colorimetry.

In one specific embodiment, an event-recording ID/sensor device uses (when energized) optical methods to determine color change (the event record). In a further specific embodiment, this provides in situ dosimetry measurement with location ID without the need for separate lab processing or imaging systems. In an alternative specific embodiment, the event-recording device monitors exposure by conductivity change and thereby avoids the need for optics altogether.

In a second specific embodiment, the event-recording device is provided in a storage tank to monitor or detect leaking underground storage tanks. Dosimetry technology suitable for such applications, when coupled with the present wireless event-recording sensor/ID invention, is described in Report No. 268: "Application of Passive Dosimetry for Detection of Leaking Underground Storage Tanks" by Francis A. DiGiano, David Leith, Daniel W. Elliott, Bruce Pate, Claudia M. Napfel, and T. Renee Anthony; Department of Environmental Sciences and Engineering, University of North Carolina at Chapel Hill (www2.ncsu.edu/ncsu/wrri/reports/fran.html. This document is incorporated herein by reference for all purposes.

In yet another embodiment, the event-recording device is distributed in large numbers to adhere to individuals without their knowledge. This use of the event-recording devices may be useful in tactical applications to track personnel position (friendly or hostile). An event detected by the event-recording device may include proximity to a known location or perimeter penetration. The event-recording devices may be distributed by any means such as air burst munitions or spray via a dispenser strategically located in a road or bridge, for example. The event-recording devices may include activation based on heat or chemicals given off by humans and may also include means to adhere to fabric such as extendable probes.

In another application, a collection of event-recording devices are buried or otherwise obscured in trenches alongside new pipeline installations to help in the location of pipe for construction and repair purposes. In one embodiment, the transponder is provided as a diode-loaded-dipole ("DLD" although an RFID tag or other mechanism may be employed). In the case of DLDs, the ID is the resonant frequency; a high quality resonator enables the discrimination of multiple DLDs. An above ground direction-finding reader illuminates an area where a pipe may be buried. A nonlinear response indicates the presence of the buried pipe. A passive sensor is coupled to a DLD device (or a buried RFID) to indicate that a change in sensor state has occurred. This may be evidenced by a significant resonant frequency shift, for example. This allows for various pipeline diagnostics. Quantities to be sensed include leakage, pH, soil motion, etc.

To generalize, the dipoles could be replaced with other resonant structures such as loops, patches, monopoles, resonant cavities, and the like. The diodes could be replaced with transistors or other non-linear electrical devices. A balanced arrangement of diodes (or similar paired nonlinear circuit elements) could be used to produce odd harmonics efficiently, while only weakly exciting even harmonics. An event-recording sensor attached to the device could create an open-circuit in one of the two circuit paths, thereby creating an unbalanced circuit, which will efficiently produce even and odd harmonics. The presence of an even harmonic (such as the $2^{nd}$ harmonic) or the ratio of an even harmonic to an odd harmonic (such as the $2^{nd}$ harmonic to the $3^{rd}$ harmonic) can be used to determine whether or not an event has occurred.

In one refinement of this embodiment, an RFID device can be used to provide clear identification of a zone that contains multiple DLDs. The DLDs respond with unique IDs (e.g., they could resonate at slightly different frequencies), but there would only be a limited number of combinations. For example, in the case of an RLV, there are about 20,000 tiles, a DLD might respond at 10–100 different frequencies, requiring distribution of RFIDs which distinguish 200–2000 zones. (These numbers are for illustration purposes only.) The DLDs each contain the sensor(s). A family of DLDs is associated with each RFID.

Other applications include corrosion detection (in bridges and aircraft for example) by detecting a threshold change in conductivity (e.g., corrosion of material of interest breaks a circuit connection); water absorption detection (by a hygroscopic material for example) by detecting a change in EMF, conductivity, etc., ion detection (by precipitation of an insoluble species such AgCl for chloride detection) by detecting a change in opacity for example, and the like. Note that for many of these applications, the "event" involves a level of exposure. The device reports how much exposure has occurred. The value of conductivity, opacity, absorption, etc. correlates to the level of exposure. The event-recording device can report this level.

Figure 6:
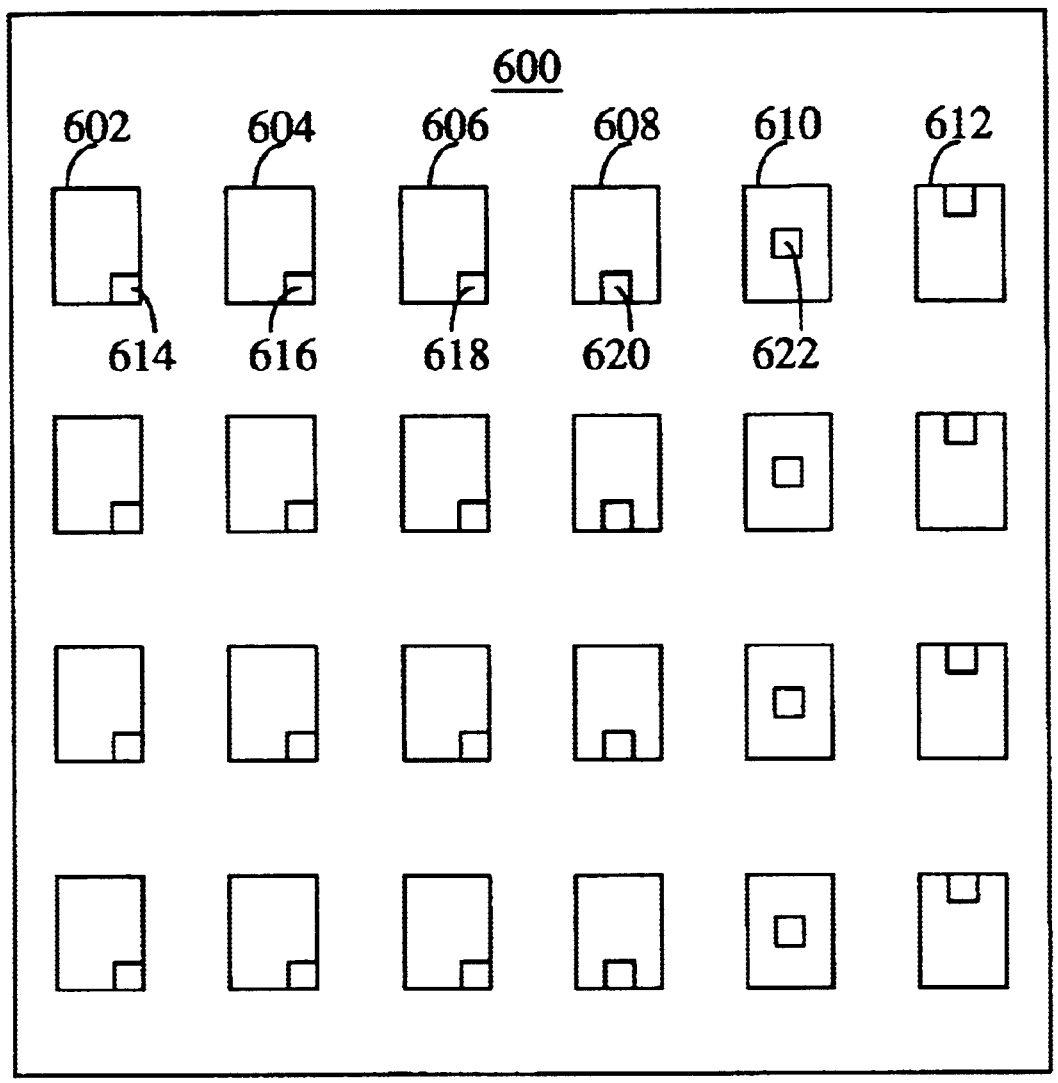
FIG. 6 illustrates a sensor array in accordance with an embodiment of this invention.

FIG. 6 illustrates a block diagram of a sensor array in system 600, in accordance with one embodiment of the invention. The system 600 includes a plurality of individual items 602, 604, 606, 608, 610 and 612 which are being monitored for an event. In this case, each individual item is associated with a single wireless recording device. The wireless recording devices may be associated with the individual items in the same manner as in individual items 602, 604 and 606 and respective wireless recording devices 614, 616 and 618. Alternately, the wireless recording devices may be variably associated with the individual items as in individual items 606, 608 and 610 and respective wireless recording devices 618, 620 and 622.

It should be borne in mind that although one wireless recording device is associated with each individual item of system 600 in this case, it is also possible to associate more than one wireless recording device for each item. Alternately, not each item of system 600 may include a wireless recording device. Further, multiple sensors implemented on a single item may not be identical and may record different events, properties, or have different structures and levels of complexity.

The entire recording device should be designed to withstand the conditions to which it will likely be exposed. Unique environmental conditions may necessitate novel components of the wireless threshold recording device. As indicated above, thermal protection systems of reusable launch vehicles (RLVs) provide one specific application for the wireless threshold recording devices and communication methods of this invention. In the RLV/TPS example, the entire event-recording device components must also be able to operationally withstand these conditions. Generally, all components of a event-recording device, including those omitted from description herein for brevity's sake, should be capable of surviving environmental conditions greater than the over-limit values they are intended to sense. This implies, in the case of semiconductor devices, that operating/survival temperature may guide the choice of materials to include preferably silicon on insulator (SOI), gallium arsenide, or silicon carbide. Other semiconductor materials (e.g., silicon, germanium, indium phosphide, gallium nitride, ternary compounds, II–VI compounds, etc.) may also be appropriate for certain applications. The recorded ID information of the devices should also survive the radiation environment of space. If needed, EEPROM devices may be constructed on SOI or replaced with PROM devices (fusible links), ferroelectric memory, or other intrinsically radiation-hard devices. The devices should also survive over the design life of the RLV (e.g., 100 missions) and not be compromised by fatigue and wear.

To this end, specialty alloy solders may be employed as over-temperature fuses to withstand the temperature range of interest. Solder materials used in over-temperature fuses are available in a wide variety of alloy combinations and thus allow flexibility in the design of a thermal fuse. Melting temperatures for solder based fuses may range from 100 degrees Celsius to 1220 degrees Celsius and may have any tolerance suitable for an application. In one embodiment, eutectic solders are used due to their defined melting point. Solder materials may include Indium, tin, cadmium, lead, silver, gold, germanium and any other materials known in the art. Suitable solder materials are available from Indium Corporation of America of Clinton, N.Y. or Arconium of Providence, R.I.

For detection of hot gas penetration, one embodiment is to place wireless threshold recording devices within or attached to individual TPS tiles (e.g., in the gaps between the tiles or at the bondline). This allows recording tile conditions during reentry together with post flight automated interrogation. Advantageously, the repeatability and cost savings the invention for the TPS application is substantial since it eliminates the manual labor involved with individually inspecting each tile. In addition, the remote passive sensing system enables the detection of structural defects that may not be otherwise detected by manual inspection, active sensors, or other conventional monitoring techniques.

The event-recording devices may measure over-temperature conditions, over-stress conditions, the existence of charring, etc. The choice of temperature limits (or other parameter limits) and placement of sensors will depend on material properties, TPS geometry, thermal environment and several other factors. The sensors used in this case may include, for example, a fuse type, a latching type or a circuit-breaker type. The fuse design is for single use in detecting a temperature over-limit and requires repair and insertion of a new sensor if such an over-limit occurs. Suitable fuses are available commercially and include spring-loaded fuses and solder wire fuses. For a tile-based TPS, it may be desirable to embed each sensor/ID tag combination between the gaps of the ceramic tiles. Alternately, the event-recording devices could be embedded beneath the ceramic tiles, in thermal blanket material, or within the cavities of metal overlapping tiles.

As there are a large number of tiles on the Space Shuttle, the size, weight, and cost of each event-recording device then becomes important. To reduce cost and weight, many modifications may be made to conventional RFID devices or those described above. By way of example, the ferrite-rod antennas of the commercial low-frequency "rice-grain" RFID tag 202 may be replaced with air-core coils. In this case, capacitance and inductance values may be selected to provide a resonance circuit of 13.56 MHz. In one embodiment, annular multiturn loop air-core coils are used and mounted such that their axes are not perpendicular to a nearby metal structure.

Other weight reduction strategies include using solder ball packages for a microchip, flexible printed circuit boards and reduced weight sensor strategies. Flexible printed circuit boards may be wrapped around components after attachment and joined, forming a sleeve encapsulation. In embodiments where an over-temperature sensor is used to change the data stream of an RFID microchip, one weight reduction strategy relative to an RFID implementing a resonance frequency shift is to remove a capacitor. In this case, only one sensor is needed detecting one or more events per RFID device. Using a sensor to change the data stream also allows the frequency to be fixed, which removes the need for a high quality factor and allows a smaller and lighter capacitor to be used. Weight reduction should also be performed without affecting performance characteristics of the RFID device. By way of example, reducing coil weight and mass should be performed without affecting read range. Other performance parameters which should not be affected include turn-on voltage, charge of the resonator, size and length of the coil and inductance of the coil.

In a specific embodiment, RFID tags are used in conjunction with a passive temperature threshold sensor to monitor TPS health. As mentioned, RFID tags are small devices that contain an identification (ID) code which can be read remotely using radio frequency means. For TPS monitoring, the recording device senses and stores a parameter of interest, such as whether the temperature under a tile exceeded a threshold value during reentry, and then reads it out along with the tile's identification code during post-flight inspection. The ID code provides a means of automatically logging the data entry corresponding to the status of each RFID tag and corresponding tile.

In the TPS health monitoring application, each individual event-recording device may be identified as belonging to a unique location or known location relative to a tile. In this application, where 22,000 individual event-recording devices may be implemented, the ID tag may include a 16 bit signal in which the least significant bit is reserved for the status of the memory component and the remaining 15 bits are reserved for identification of the individual event-recording device. In another embodiment, the ID tag includes an 18 bit signal in which the three least significant bits are reserved for identifying the status of multiple thresholds and the remaining 15 bits are reserved for identifying the specific event-recording device.

The TPS of an RLV may be probed by various interrogation systems such as a portal through which the RLV passes, a hand-held interrogator moved about the RLV, a vehicle mounted RLV, and the like. In the case of a portal, an RLV passes through the portal prior to launch. The portal may conform to the shape of the RLV to provide a substantially consistent read range distance. Radio frequency power, transmitted on an RF wave by the portal is used to power the wireless transponders of an individual recording device. Each device may then be individually powered and interrogated as it passes through the portal. This causes each event-recording device to return and its identification code and status to the portal when polled. If at least one sensor has recorded a temperature threshold over-limit, then the RLV may be prevented from flight. At this point, RLV may be detained for detailed inspection or potentially garaged which may include replacement of unhealthy tiles.

In addition to monitoring TPS health for an RLV, RFID tags of the present invention may also be used in determining whether the application of a re-waterproofing agent is necessary. The shuttle and future RLVs may use a flexible TPS blanket material in regions exposed to modest thermal transients. This blanket material is treated with an organic waterproofing agent (dimethylethoxysilane or DMES) that prevents vehicle weight gain due to moisture absorption. The depth of penetration of a 1050 degree Fahrenheit isotherm determines whether the application of the re-waterproofing agent is necessary. Resetable temperature sensors placed near the bondline of the blanket material can be used to determine the depth of the isotherm.

The present invention may also find use for inspecting and maintaining the structural and functional integrity of large structures other than the RLV applications briefly mentioned. Such systems include highways, bridges, buildings, aircraft, food or waste products, etc. Devices may be variably located in such materials including insulation materials, concrete, cement or mortar, asphalt or asphalt concrete, structural honeycomb, glues, liquids (stationary or flowing), plastics, soils, or inaccessible compartments of complex structures such as aircraft or trains, and the like. Devices may also be embedded into a variety of materials such as dielectric, lossy dielectric, or even metal coated materials (so long as the skin depth of the material is small compared to the wavelength of the interrogation). In addition to the above mentioned applications, the event recording devices of the present invention are generally applicable to any industry where rapid or remote inspection is useful. The inspection may pertain to the health or status of individual components or a complete product package. This includes, but is not limited to, chemical products, medical products, semiconductor and computer products, electronics, automotive products and other products subject to damage or degradation which may require condition monitoring.

Advantageously, an RF interrogation mechanism and passive sensor allow for a threshold recording device that is substantially lighter and smaller than the prior art active communication means or sensor. The large number of tiles on the RLV coupled with the size and weight restrictions of the RLV problem restrict the sensor and communication outside of prior art capabilities. In one embodiment, each event-recording devices may have a mass as low as 9 mg wherein 50,000 devices would weigh approximately 1 lb. In another embodiment, each device has a diameter between 20 and 150 mils. In a specific TPS embodiment, each device has a diameter less than 30 mils to fit within a 30 mil gap between TPS tiles. Additionally, for the case of automated TPS monitoring, recertification inspection of as many as 50,000 event-recording devices could occur in a matter of hours for the case of a hand held reader, and in a matter of minutes for a portal based interrogator.

10. Conclusion

The versatility, small size and wireless unobtrusive nature of the inventive remote event-recording devices allow for sensor application in many interesting applications. Coupling the transponder, the sensor, and the recording mechanism together allows for reduced weight and size. Further, the identification means of the inventive recording devices allow for monitoring of systems where potentially thousands of sensors are implemented and each sensor may be individually monitored.

Another advantage of the invention is that monitoring may flexibly be performed after the event at a more practical or favorable time. As occurrence of the event being monitored may be significantly diverse, such as the case for packages travelling around the world, a monitoring system which may flexibly adapt to event occurrence diversity may allow for significant efficiency improvements in data processing over conventional active sensing. In addition, the ability to flexibly automate the interrogation process allows for rapid and cost efficient inspection alternatives. As described, the invention advantageously hastens the TPS inspection process and may notably reduce operational costs and turnaround time. In addition to the versatility gained in the inventive TPS application, the need for manual inspection and potential damage to the tiles may be eliminated.

While this invention has been described in terms of several preferred embodiments, there are alterations, permutations, and equivalents that fall within the scope of this invention which have been omitted for brevity's sake. It is therefore intended that the scope of the invention should be determined with reference to the appended claims.

What is claimed is:

1. A system for reporting a physical or chemical state or event, the system comprising:
   (a) a device having at least two device states, one of the two device states corresponding corresponding to the physical or chemical state or event, the device comprising:
      a sensor for detecting the physical or chemical state or event wherein the sensor includes a first portion for latching onto one of a plurality of stops during an expansion of the sensor,
      a recording mechanism coupled to the sensor and recording the device state such that the device state changes upon occurrence of the physical or chemical event or a change in the physical or chemical state, and
      a transponder configured to transmit a signal indicating the device state when triggered by a wireless interrogation signal; and
   (b) an interrogator for externally probing the state of the device to determine whether the device state has changed, wherein the interrogator is designed or configured to (i) read the device state by providing the wireless interrogation signal to the transponder, (ii) compare the device state that it has read against a stored device state to determine whether the device state has changed and thereby indicate the physical or chemical event or the change in the physical or chemical state, and (iii) update the stored device state with the device state that it has just read.

2. The device of claim 1 wherein the recording mechanism cannot spontaneously return from the second state to the first state when the physical or chemical event ceases or the change in the physical or chemical state reverses.

3. The system of claim 1, wherein the sensor is a temperature sensor, an accelerometer, a pressure sensor, a flow sensor, a chemical concentration sensor or a position sensor.

4. The system of claim 1, wherein the sensor and the recording mechanism are provided in a single electrical, electromechanical or latching device.

5. The system of claim 1, wherein the recording mechanism is a resonating electrical circuit having a resonance frequency that changes with the device state.

6. The system of claim 1, wherein the recording mechanism and the transponder are provided as a single structure.

7. The system of claim 6, wherein the single structure includes a resonating electrical circuit.

8. The system of claim 1, wherein the transponder includes a modulator and an antenna.

9. The system of claim 1, wherein the interrogator powers the transponder and receives the signal indicating the physical or chemical state or event.

10. The system of claim 1, further comprising a database including the stored device state.

11. The system of claim 10, wherein database further comprises records identifying the locations and device states of multiple wireless devices.

12. The system of claim 11, wherein each of the multiple wireless devices includes a tag that contains identification information that can distinguish each wireless device from the other wireless devices.

13. The system of claim 12, wherein the signal transmitted by the transponder includes the identification information.

14. A method for reporting a physical or chemical state or event by using a device that changes a device state when exposed to the physical or chemical state or event, the method comprising:
   exposing the device to a first environment wherein the device comprises:
      a sensor for detecting the physical or chemical state or event wherein the sensor includes a first portion for latching onto one of a plurality of stops during an expansion of the sensor,
      a recording mechanism coupled to the sensor and recording the device state such that the device state changes upon occurrence of the physical or chemical event or a change in the physical or chemical state, and
      a transponder configured to transmit a signal indicating the device state when triggered by a wireless interrogation signal;
   probing the device with an interrogator to determine its current device state and thereby determine whether the first environment provided the physical or chemical state or event;
   saving the current device state as a saved device state;
   without physically resetting the device state, exposing the device to a second environment which potentially could provide the physical or chemical state or event to cause the device state to change; and
   probing the device with the interrogator to determine if its current device state is different from the saved device state and thereby determine whether the second environment provided the physical or chemical state or event.

15. The method of claim 14, wherein the saving the current device state stores the current device state in a database.

16. The method of claim 15, wherein database further comprises records identifying the locations and device states of multiple devices.

17. The method of claim 16, wherein each of the multiple devices includes a tag that contains identification information that can distinguish each device from the other devices, and wherein the database includes said identification information.

18. The method of claim 14, wherein probing the device with the interrogator comprises transmitting a wireless probe signal to the device and receiving a wireless device signal from the device, wherein the wireless device signal from the device specifies the current device state.

19. The method of claim 18, wherein the wireless device signal from the device is a different frequency than the wireless probe signal to the device.

20. The method of claim 18, wherein the wireless device signal from the device contains information to be used in specifying the current device state.

21. The method of claim 14, wherein the event signals device operability.

22. The method of claim 14, wherein probing the device includes using a swept or stepped frequency interrogation signal.

23. The method of claim 14, wherein probing the device includes using an anticollision algorithm.

24. A device for reporting a physical or chemical state or event, the device comprising:
   a sensor for detecting the physical or chemical state or event without using a power source wherein the sensor includes a first portion for latching onto one of a plurality of stops during an expansion of the sensor;
   a recording mechanism coupled to the sensor for recording that the physical or chemical state or event has occurred, wherein the recording mechanism allows recording of multiple physical or chemical events or state changes, each associated with a distinct device state;

a tag that contains identification information that can distinguish said device from a plurality of similar devices; and a transponder, coupled to the recording mechanism and the tag, configured to transmit a signal indicating (i) the device state and thereby indicating the physical or chemical state or event and (ii) the identification information when triggered by a wireless interrogation signal.

25. The device of claim 24 wherein the recording mechanism cannot spontaneously return from the second state to the first state when the physical or chemical event ceases or the change in the physical or chemical state reverses.

26. The device of claim 24, wherein the sensor is a temperature sensor, a pressure sensor, a flow sensor, a chemical concentration sensor or a position sensor.

27. The device of claim 26, wherein the sensor and the recording mechanism are provided in a single electrical, electromechanical or latching device.

28. The device of claim 26, wherein the single device includes three or more device states, each indicating a distinct physical or chemical event or state change.

29. The device of claim 24, wherein the states are recycled.

30. The device of claim 24, wherein the first portion includes a hook for latching onto at least one of the stops.

31. The device of claim 24, wherein the sensor includes a second portion for latching onto at least one stop during a contraction of the sensor.

32. The device of claim 24, further including a transduction mechanism for converting the distinct device state into electrical representation.

33. The device of claim 24, further including a disturbance resistance mechanism which is resistant to one of vibration, shock, acceleration and magnetization.

34. The device of claim 31, wherein the second portion includes a hook for latching onto the at least one stop.

35. The device of claim 24, wherein the expansion of the sensor is provided by a dimensional change resulting from a thermal input to a material.

36. The device of claim 35, wherein the material is comprised of a solid, liquid, gas or combinations thereof.

37. The device of claim 35, wherein the dimensional change is induced by a phase-change in the material.

38. The device of claim 24, wherein the expansion of the sensor is provided by a thermal expansion of a material.

39. The device of claim 38, wherein the material is a metal.

40. The device of claim 38, wherein the material comprises a first material joined to a second material wherein a portion of the expansion results from a difference in thermal expansion rates between the first material and the second material.

41. The device of claim 40, wherein the material is a bi-metal.

42. The device of claim 24, wherein the recording mechanism is a resonating electrical circuit having a resonance frequency that changes with the device state.

43. The device of claim 24, wherein the sensor includes a bi-metal ratchet.

44. The device of claim 24, wherein the plurality of stops are arranged along a closed path.

45. The device of claim 44, wherein the closed path is a circle.

46. The device of claim 24, wherein the plurality of stops are arranged along an open path.

47. The device of claim 46, wherein the open path is a line.

48. The device of claim 24, wherein the sensor is re-settable.

49. The device of claim 48, wherein a reset of the sensor is a logical reset.

50. The device of claim 48, wherein a reset of the sensor is a physical reset comprising an adjustment of at least one physical element of the sensor.

51. The device of claim 24, wherein one or more latching states of the first portion relative to one or more of the stops is stored on the device.

52. The device of claim 51, wherein the sensor further comprises circuitry for monitoring the latching states of the first portion relative to one or more of the stops.

53. The device of claim 51, wherein the sensor further comprises a memory device for storing one or more of the latching states of the sensor.

54. The device of claim 53, wherein the memory devices stores a plurality of latching states that have occurred between a first interrogation and a second interrogation of the device.

55. The device of claim 51, wherein the sensor further comprises circuitry for comparing a first latching state with a second latching state.

56. The device of claim 55, wherein differences between the first latching state and the second latching state are used to determine whether one of the events has occurred.

57. The device of claim 24, wherein a distance between adjacent stops in the plurality of stops is increased or decreased to record events of different magnitudes.

58. The device of claim 24, wherein the expansion of the sensor is induced by a change in magnetic properties of a material in the sensor.

59. The device of claim 24, wherein the device further comprises a second sensor.

60. The device of claim 24, wherein the device is a microelectromechanical system.

* * * * *